US008566874B2

(12) United States Patent
Roberts et al.

(10) Patent No.: US 8,566,874 B2
(45) Date of Patent: Oct. 22, 2013

(54) CONTROL TOOLS FOR MEDIA CONTENT ACCESS SYSTEMS AND METHODS

(75) Inventors: Brian Roberts, Frisco, TX (US); Heath Stallings, Grapevine, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1112 days.

(21) Appl. No.: 11/542,352

(22) Filed: Oct. 3, 2006

(65) Prior Publication Data

US 2008/0092171 A1 Apr. 17, 2008

(51) Int. Cl.
*G06F 3/00* (2006.01)
*G06F 9/00* (2006.01)
*G09G 5/00* (2006.01)

(52) U.S. Cl.
USPC ................... 725/43; 725/46; 725/47; 725/52

(58) Field of Classification Search
USPC ............................... 725/37, 39, 40, 43, 44, 51
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,158,155 A | 10/1992 | Domain et al. |
| 5,253,066 A | 10/1993 | Vogel |
| 5,305,435 A * | 4/1994 | Bronson ........................ 715/777 |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,442,390 A | 8/1995 | Hooper et al. |
| 5,473,362 A | 12/1995 | Fitzgerald et al. |
| 5,479,266 A | 12/1995 | Young et al. |
| 5,479,268 A | 12/1995 | Young et al. |
| 5,499,103 A | 3/1996 | Mankovitz |
| 5,510,811 A | 4/1996 | Tobey et al. |
| 5,512,963 A | 4/1996 | Mankovitz |
| 5,515,173 A | 5/1996 | Mankovitz et al. |
| 5,517,257 A | 5/1996 | Dunn et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,585,838 A | 12/1996 | Lawler et al. |
| 5,600,368 A | 2/1997 | Matthews |
| 5,600,711 A | 2/1997 | Yuen |
| 5,616,876 A | 4/1997 | Cluts |
| 5,619,274 A | 4/1997 | Roop et al. |
| 5,623,613 A | 4/1997 | Rowe et al. |

(Continued)

*Primary Examiner* — Vivek Srivastava
*Assistant Examiner* — Carmine Malangone

(57) ABSTRACT

In one of many possible embodiments, a system includes a media content processing subsystem including an output driver configured to provide at least a component of a media content instance to a display for presentation to a user, and a receiver configured to receive an input command initiated by the user during the presentation of the component of the media content instance. The media content processing subsystem is further configured to select a control pane from a group of control panes based on the input command, each of the control panes including a different set of control tools, and provide, in response to the input command, the control pane to the display for concurrent presentation of both the component of the media content instance and the control pane to the user.

25 Claims, 12 Drawing Sheets

(56) References Cited

U.S. PATENT DOCUMENTS

| | | |
|---|---|---|
| 5,630,119 A | 5/1997 | Aristides et al. |
| 5,640,484 A | 6/1997 | Mankovitz |
| 5,648,824 A | 7/1997 | Dunn et al. |
| 5,654,748 A | 8/1997 | Matthews |
| 5,657,072 A | 8/1997 | Aristides et al. |
| 5,673,401 A | 9/1997 | Volk et al. |
| 5,677,708 A | 10/1997 | Matthews et al. |
| 5,678,012 A | 10/1997 | Kimmich et al. |
| 5,682,511 A | 10/1997 | Sposato et al. |
| 5,684,525 A | 11/1997 | Klosterman |
| 5,687,331 A | 11/1997 | Volk et al. |
| 5,689,663 A | 11/1997 | Williams |
| 5,699,107 A | 12/1997 | Lawler et al. |
| 5,701,383 A | 12/1997 | Russo et al. |
| 5,706,145 A | 1/1998 | Hindman et al. |
| 5,721,829 A | 2/1998 | Dunn et al. |
| 5,724,492 A | 3/1998 | Matthews et al. |
| 5,727,060 A | 3/1998 | Young |
| 5,731,844 A | 3/1998 | Rauch et al. |
| 5,734,786 A | 3/1998 | Mankovitz |
| 5,734,823 A | 3/1998 | Saigh et al. |
| 5,734,891 A | 3/1998 | Saigh |
| 5,745,095 A | 4/1998 | Parchem et al. |
| 5,745,713 A | 4/1998 | Ferguson et al. |
| 5,751,282 A | 5/1998 | Girard et al. |
| 5,752,160 A | 5/1998 | Dunn |
| 5,757,417 A | 5/1998 | Aras et al. |
| 5,758,258 A | 5/1998 | Shoff et al. |
| 5,758,259 A | 5/1998 | Lawler |
| 5,774,172 A | 6/1998 | Kapell et al. |
| 5,781,228 A | 7/1998 | Sposato |
| 5,790,115 A | 8/1998 | Pleyer et al. |
| 5,790,198 A | 8/1998 | Roop et al. |
| 5,793,973 A | 8/1998 | Birdwell et al. |
| 5,801,787 A | 9/1998 | Schein et al. |
| 5,805,165 A | 9/1998 | Thorne et al. |
| 5,805,763 A | 9/1998 | Lawler et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,815,145 A | 9/1998 | Matthews |
| 5,815,195 A | 9/1998 | Tam |
| 5,818,439 A * | 10/1998 | Nagasaka et al. ............... 725/87 |
| 5,828,945 A | 10/1998 | Klosterman |
| 5,857,190 A | 1/1999 | Brown |
| 5,861,906 A | 1/1999 | Dunn et al. |
| 5,870,150 A | 2/1999 | Yuen |
| 5,872,588 A | 2/1999 | Aras et al. |
| 5,874,985 A | 2/1999 | Matthews |
| 5,878,141 A | 3/1999 | Daly et al. |
| 5,883,627 A | 3/1999 | Pleyer |
| 5,886,746 A | 3/1999 | Yuen et al. |
| 5,900,905 A | 5/1999 | Shoff et al. |
| 5,905,522 A | 5/1999 | Lawler |
| 5,907,323 A | 5/1999 | Lawler et al. |
| 5,914,746 A | 6/1999 | Matthews et al. |
| 5,915,026 A | 6/1999 | Mankovitz |
| 5,923,362 A | 7/1999 | Klosterman |
| 5,940,073 A | 8/1999 | Klosterman et al. |
| 5,940,074 A | 8/1999 | Britt et al. |
| 5,945,987 A | 8/1999 | Dunn |
| 5,945,991 A | 8/1999 | Britt et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,987,509 A | 11/1999 | Portuesi |
| 5,988,078 A | 11/1999 | Levine |
| 5,990,883 A | 11/1999 | Byrne et al. |
| 5,991,498 A | 11/1999 | Young |
| 6,002,394 A | 12/1999 | Schein et al. |
| 6,002,852 A | 12/1999 | Birdwell et al. |
| 6,005,563 A | 12/1999 | White et al. |
| 6,008,803 A | 12/1999 | Rowe et al. |
| 6,008,836 A | 12/1999 | Bruck et al. |
| 6,014,706 A | 1/2000 | Cannon et al. |
| 6,016,141 A | 1/2000 | Knudson et al. |
| 6,025,837 A | 2/2000 | Matthews et al. |
| 6,028,599 A | 2/2000 | Yuen et al. |
| 6,028,604 A | 2/2000 | Matthews et al. |
| 6,034,689 A | 3/2000 | White et al. |
| 6,049,652 A | 4/2000 | Yuen et al. |
| 6,052,145 A | 4/2000 | Macrae et al. |
| 6,055,314 A | 4/2000 | Spies et al. |
| D424,061 S | 5/2000 | Backs et al. |
| D424,577 S | 5/2000 | Backs et al. |
| 6,064,376 A * | 5/2000 | Berezowski et al. ............ 725/42 |
| 6,072,485 A | 6/2000 | Barnes et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,098,086 A | 8/2000 | Krueger et al. |
| 6,118,492 A | 9/2000 | Milnes et al. |
| D431,552 S | 10/2000 | Backs et al. |
| 6,133,909 A | 10/2000 | Schein et al. |
| 6,133,913 A | 10/2000 | White et al. |
| 6,137,950 A | 10/2000 | Yuen |
| 6,141,003 A | 10/2000 | Chor et al. |
| 6,141,678 A | 10/2000 | Britt |
| D433,403 S | 11/2000 | Backs et al. |
| D434,043 S | 11/2000 | Holland et al. |
| 6,144,375 A * | 11/2000 | Jain et al. ....................... 715/251 |
| 6,144,378 A | 11/2000 | Lee |
| 6,144,401 A | 11/2000 | Casement et al. |
| 6,144,964 A | 11/2000 | Breese et al. |
| 6,151,059 A | 11/2000 | Schein et al. |
| 6,154,205 A | 11/2000 | Carroll et al. |
| D435,561 S | 12/2000 | Pettigrew et al. |
| 6,167,188 A | 12/2000 | Young et al. |
| 6,169,541 B1 | 1/2001 | Smith |
| 6,173,317 B1 | 1/2001 | Chaddha et al. |
| 6,177,931 B1 | 1/2001 | Alexander et al. |
| 6,177,945 B1 | 1/2001 | Pleyer |
| 6,182,072 B1 | 1/2001 | Leak et al. |
| 6,184,877 B1 | 2/2001 | Dodson et al. |
| 6,188,401 B1 | 2/2001 | Peyer |
| 6,215,483 B1 | 4/2001 | Zigmond |
| 6,215,526 B1 | 4/2001 | Barton et al. |
| 6,216,265 B1 | 4/2001 | Roop et al. |
| 6,230,319 B1 | 5/2001 | Britt et al. |
| 6,233,389 B1 | 5/2001 | Barton et al. |
| 6,237,022 B1 | 5/2001 | Bruck et al. |
| 6,239,794 B1 | 5/2001 | Yuen et al. |
| 6,240,555 B1 * | 5/2001 | Shoff et al. .................... 725/110 |
| 6,247,176 B1 | 6/2001 | Schein et al. |
| D445,801 S | 7/2001 | Ma |
| 6,259,442 B1 | 7/2001 | Britt et al. |
| 6,262,722 B1 | 7/2001 | Allison et al. |
| 6,263,501 B1 | 7/2001 | Schein et al. |
| 6,266,059 B1 | 7/2001 | Matthews et al. |
| 6,266,684 B1 * | 7/2001 | Kraus et al. .................... 715/209 |
| 6,268,856 B1 | 7/2001 | Bruck et al. |
| 6,292,834 B1 | 9/2001 | Ravi et al. |
| 6,304,969 B1 | 10/2001 | Wasserman et al. |
| 6,308,202 B1 | 10/2001 | Cohn et al. |
| 6,310,886 B1 | 10/2001 | Barton |
| 6,311,197 B2 | 10/2001 | Mighdoll et al. |
| 6,311,207 B1 | 10/2001 | Mighdoll et al. |
| D450,058 S | 11/2001 | Istvan et al. |
| D450,324 S | 11/2001 | Istvan et al. |
| D450,711 S | 11/2001 | Istvan et al. |
| 6,313,851 B1 | 11/2001 | Matthews et al. |
| 6,317,780 B1 | 11/2001 | Cohn et al. |
| 6,317,791 B1 | 11/2001 | Cohn et al. |
| 6,317,885 B1 | 11/2001 | Fries |
| 6,323,911 B1 | 11/2001 | Schein et al. |
| 6,327,418 B1 | 11/2001 | Barton |
| 6,330,719 B1 | 12/2001 | Zigmond et al. |
| 6,340,997 B1 | 1/2002 | Borseth |

(56) References Cited

U.S. PATENT DOCUMENTS

| | | |
|---|---|---|
| 6,341,195 B1 | 1/2002 | Mankovitz et al. |
| 6,341,374 B2 | 1/2002 | Schein et al. |
| D453,767 S | 2/2002 | Istvan et al. |
| D453,768 S | 2/2002 | Wilkins |
| D453,936 S | 2/2002 | Istvan et al. |
| 6,344,865 B1 | 2/2002 | Matthews et al. |
| 6,345,264 B1 | 2/2002 | Breese et al. |
| 6,347,398 B1 | 2/2002 | Parthasarathy et al. |
| 6,353,813 B1 | 3/2002 | Breese et al. |
| 6,378,035 B1 | 4/2002 | Parry et al. |
| 6,385,739 B1 | 5/2002 | Barton et al. |
| 6,388,714 B1 | 5/2002 | Schein et al. |
| 6,392,664 B1 | 5/2002 | White et al. |
| 6,396,473 B1 | 5/2002 | Callahan et al. |
| 6,396,546 B1 | 5/2002 | Alten et al. |
| 6,397,388 B1 | 5/2002 | Allen |
| 6,400,407 B1 | 6/2002 | Zigmond et al. |
| 6,412,110 B1 | 6/2002 | Schein et al. |
| 6,412,112 B1 | 6/2002 | Barrett et al. |
| 6,424,342 B1 | 7/2002 | Perlman et al. |
| 6,425,125 B1 | 7/2002 | Fries et al. |
| 6,430,358 B1 | 8/2002 | Yuen et al. |
| 6,430,359 B1 | 8/2002 | Yuen et al. |
| D462,333 S | 9/2002 | Novak |
| D462,339 S | 9/2002 | Allen et al. |
| D463,444 S | 9/2002 | Istvan et al. |
| 6,449,766 B1 | 9/2002 | Fleming |
| 6,453,471 B1 | 9/2002 | Klosterman |
| D463,788 S | 10/2002 | Smith et al. |
| 6,460,180 B1 | 10/2002 | Park et al. |
| 6,460,181 B1 | 10/2002 | Donnelly |
| 6,463,486 B1 | 10/2002 | Parry et al. |
| 6,466,734 B2 | 10/2002 | Yuen et al. |
| 6,469,721 B2 | 10/2002 | Matthews et al. |
| 6,469,753 B1 | 10/2002 | Klosterman et al. |
| 6,473,858 B1 | 10/2002 | Shimomura et al. |
| D465,227 S | 11/2002 | Ro et al. |
| 6,477,705 B1 | 11/2002 | Yuen et al. |
| 6,487,646 B1 | 11/2002 | Adams et al. |
| 6,489,986 B1 | 12/2002 | Allen |
| 6,490,722 B1 | 12/2002 | Barton et al. |
| 6,496,205 B1 | 12/2002 | White et al. |
| 6,498,754 B2 | 12/2002 | Peting et al. |
| 6,498,895 B2 | 12/2002 | Young et al. |
| 6,499,057 B1 | 12/2002 | Portuesi |
| D468,274 S | 1/2003 | Novak |
| D469,104 S | 1/2003 | Istvan et al. |
| D469,443 S | 1/2003 | Wilkins et al. |
| 6,505,232 B1 | 1/2003 | Mighdoll et al. |
| 6,505,348 B1 | 1/2003 | Knowles et al. |
| D470,152 S | 2/2003 | Witus |
| D470,153 S | 2/2003 | Billmaier et al. |
| 6,519,771 B1 | 2/2003 | Zenith |
| 6,526,471 B2 | 2/2003 | Shimomura et al. |
| 6,526,580 B2 | 2/2003 | Shimomura et al. |
| 6,529,233 B1 | 3/2003 | Allen |
| 6,535,253 B2 | 3/2003 | Barton et al. |
| 6,535,920 B1 | 3/2003 | Parry et al. |
| 6,538,701 B1 | 3/2003 | Yuen |
| 6,539,375 B2 | 3/2003 | Kawasaki |
| 6,549,719 B2 | 4/2003 | Mankovitz |
| D474,197 S | 5/2003 | Nguyen |
| 6,559,866 B2 | 5/2003 | Kolde et al. |
| 6,559,894 B2 | 5/2003 | Omura et al. |
| 6,560,678 B1 | 5/2003 | Weissman et al. |
| 6,560,777 B2 | 5/2003 | Blackketter et al. |
| 6,564,379 B1 | 5/2003 | Knudson et al. |
| 6,567,606 B2 | 5/2003 | Milnes et al. |
| 6,570,581 B1 | 5/2003 | Smith |
| 6,571,390 B1 | 5/2003 | Dunn et al. |
| 6,571,392 B1 | 5/2003 | Zigmond et al. |
| D475,718 S | 6/2003 | Witus et al. |
| 6,577,346 B1 | 6/2003 | Perlman |
| D476,994 S | 7/2003 | Simmons et al. |
| 6,588,013 B1 | 7/2003 | Lumley et al. |
| D478,090 S | 8/2003 | Nguyen et al. |
| D478,595 S | 8/2003 | Istvan et al. |
| D478,912 S | 8/2003 | Johnson |
| 6,606,652 B1 | 8/2003 | Cohn et al. |
| 6,628,301 B1 | 9/2003 | Acton et al. |
| 6,628,302 B2 | 9/2003 | White et al. |
| D480,733 S | 10/2003 | Hammerquist et al. |
| 6,630,963 B1 | 10/2003 | Billmaier |
| 6,631,523 B1 | 10/2003 | Matthews et al. |
| 6,633,877 B1 | 10/2003 | Saigh et al. |
| 6,637,029 B1 * | 10/2003 | Maissel et al. ............ 725/46 |
| 6,637,031 B1 | 10/2003 | Chou |
| 6,637,032 B1 | 10/2003 | Feinleib |
| 6,642,939 B1 | 11/2003 | Vallone et al. |
| 6,643,798 B2 | 11/2003 | Barton et al. |
| 6,651,251 B1 | 11/2003 | Shoff et al. |
| RE38,376 E | 12/2003 | Matthews, III |
| 6,662,218 B2 | 12/2003 | Mighdoll et al. |
| 6,668,133 B2 | 12/2003 | Yuen et al. |
| 6,668,377 B1 | 12/2003 | Dunn |
| 6,678,737 B1 | 1/2004 | Bucher |
| 6,681,396 B1 | 1/2004 | Bates et al. |
| 6,683,630 B1 | 1/2004 | Shoff et al. |
| 6,684,025 B1 | 1/2004 | Perlman |
| D486,834 S | 2/2004 | Allen et al. |
| 6,687,906 B1 | 2/2004 | Yuen et al. |
| 6,694,352 B1 | 2/2004 | Omoigui |
| 6,698,020 B1 | 2/2004 | Zigmond et al. |
| 6,704,058 B2 | 3/2004 | Ranta |
| 6,704,773 B1 | 3/2004 | Cohn et al. |
| 6,704,776 B1 | 3/2004 | Fortune |
| 6,704,813 B2 | 3/2004 | Smirnov et al. |
| 6,704,929 B1 | 3/2004 | Ozer et al. |
| 6,708,335 B1 | 3/2004 | Ozer et al. |
| 6,710,815 B1 | 3/2004 | Billmaier et al. |
| 6,721,953 B1 | 4/2004 | Bates et al. |
| 6,724,405 B2 | 4/2004 | Matthews et al. |
| 6,727,935 B1 | 4/2004 | Allen et al. |
| 6,728,713 B1 | 4/2004 | Beach et al. |
| D490,086 S | 5/2004 | Wilkins et al. |
| 6,732,325 B1 | 5/2004 | Tash et al. |
| 6,732,369 B1 | 5/2004 | Schein et al. |
| 6,742,043 B1 | 5/2004 | Moussa et al. |
| 6,742,183 B1 | 5/2004 | Reynolds et al. |
| 6,745,391 B1 | 6/2004 | Macrae et al. |
| 6,748,375 B1 | 6/2004 | Wong et al. |
| 6,748,481 B1 | 6/2004 | Parry et al. |
| 6,754,715 B1 | 6/2004 | Cannon et al. |
| 6,756,997 B1 | 6/2004 | Ward et al. |
| 6,757,837 B1 | 6/2004 | Platt et al. |
| 6,757,906 B1 | 6/2004 | Look et al. |
| 6,760,537 B2 | 7/2004 | Mankovitz |
| 6,762,773 B2 | 7/2004 | Kolde et al. |
| 6,766,523 B2 | 7/2004 | Herley |
| 6,766,524 B1 | 7/2004 | Matheny et al. |
| D494,186 S | 8/2004 | Johnson |
| 6,772,438 B1 | 8/2004 | Blackketter et al. |
| 6,785,901 B1 | 8/2004 | Horiwitz et al. |
| 6,785,902 B1 | 8/2004 | Zigmond et al. |
| D496,665 S | 9/2004 | Billmaier et al. |
| 6,792,195 B2 | 9/2004 | Barton |
| 6,798,457 B2 | 9/2004 | Boyden et al. |
| 6,798,971 B2 | 9/2004 | Potrebic |
| 6,799,326 B2 | 9/2004 | Boylan et al. |
| 6,799,327 B1 | 9/2004 | Reynolds et al. |
| 6,804,824 B1 | 10/2004 | Potrebic et al. |
| 6,804,825 B1 | 10/2004 | White et al. |
| 6,813,643 B2 | 11/2004 | Perlman |
| 6,819,344 B2 | 11/2004 | Robbins |
| 6,820,144 B2 | 11/2004 | Smirnov et al. |
| 6,829,779 B1 | 12/2004 | Perlman |
| 6,842,837 B1 | 1/2005 | Peting et al. |
| 6,847,778 B1 | 1/2005 | Vallone et al. |
| 6,847,779 B2 | 1/2005 | Pietraszak |
| 6,850,691 B1 | 2/2005 | Stam et al. |
| 6,850,693 B2 | 2/2005 | Young et al. |
| 6,859,799 B1 | 2/2005 | Yuen |
| 6,859,937 B1 | 2/2005 | Narayan et al. |
| 6,861,952 B1 | 3/2005 | Billmaier |

(56) References Cited

U.S. PATENT DOCUMENTS

| | | |
|---|---|---|
| 6,865,555 B2 | 3/2005 | Novak |
| 6,868,225 B1 | 3/2005 | Brown et al. |
| 6,868,551 B1 | 3/2005 | Lawler et al. |
| 6,886,179 B1 | 4/2005 | Perlman |
| 6,891,553 B2 | 5/2005 | White et al. |
| 6,892,390 B1 | 5/2005 | Lieberman et al. |
| 6,897,904 B2 | 5/2005 | Potrebic et al. |
| 6,898,765 B2 | 5/2005 | Matthews et al. |
| 6,901,453 B1 | 5/2005 | Pritchett et al. |
| 6,903,753 B1 | 6/2005 | Gray et al. |
| 6,904,609 B1 | 6/2005 | Pietraszak et al. |
| 6,906,755 B2 | 6/2005 | Lundblad et al. |
| 6,907,576 B2 | 6/2005 | Barbanson et al. |
| 6,915,528 B1 | 7/2005 | McKenna |
| 6,928,652 B1 | 8/2005 | Goldman |
| 6,928,655 B1 | 8/2005 | Omoigui |
| 6,931,657 B1 | 8/2005 | Marsh |
| 6,938,077 B2 | 8/2005 | Sanders |
| 6,938,270 B2 | 8/2005 | Blackketter et al. |
| 6,941,575 B2 | 9/2005 | Allen |
| 6,943,843 B2 | 9/2005 | Boyden et al. |
| 6,944,880 B1 | 9/2005 | Allen |
| 6,947,935 B1 | 9/2005 | Horvitz et al. |
| 6,957,260 B1 | 10/2005 | Mighdoll et al. |
| 6,963,903 B2 | 11/2005 | Krueger et al. |
| 6,963,906 B2 | 11/2005 | Portuesi |
| 6,965,415 B2 | 11/2005 | Lundblad et al. |
| 6,965,730 B2 | 11/2005 | Chamberlin et al. |
| 6,966,066 B1 | 11/2005 | Zigmond et al. |
| 6,968,364 B1 | 11/2005 | Wong et al. |
| 6,970,640 B2 | 11/2005 | Green et al. |
| 6,972,787 B1 | 12/2005 | Allen et al. |
| 6,973,050 B2 | 12/2005 | Birdwell et al. |
| 6,973,664 B2 | 12/2005 | Fries |
| 6,973,669 B2 | 12/2005 | Daniels |
| 6,975,713 B1 | 12/2005 | Smith et al. |
| 6,975,717 B1 | 12/2005 | Smith et al. |
| 6,976,228 B2 * | 12/2005 | Bernhardson ............ 715/830 |
| 6,980,638 B2 | 12/2005 | Smith et al. |
| 6,980,993 B2 | 12/2005 | Horvitz et al. |
| 6,981,227 B1 | 12/2005 | Taylor |
| 6,986,062 B2 | 1/2006 | Carpenter |
| 6,990,462 B1 | 1/2006 | Wilcox et al. |
| 6,990,497 B2 | 1/2006 | O'Rourke et al. |
| 6,990,671 B1 | 1/2006 | Evans et al. |
| 6,990,676 B1 * | 1/2006 | Proehl et al. ............ 725/40 |
| 6,990,677 B1 | 1/2006 | Pietraszak et al. |
| 6,990,678 B2 | 1/2006 | Zigmond |
| 6,993,532 B1 | 1/2006 | Platt et al. |
| 6,996,390 B2 | 2/2006 | Herley et al. |
| 7,003,795 B2 | 2/2006 | Allen |
| 7,006,613 B2 | 2/2006 | Novak et al. |
| 7,007,244 B2 | 2/2006 | Pankovcin |
| D516,573 S | 3/2006 | Gibson |
| D517,059 S | 3/2006 | Newby et al. |
| D517,087 S | 3/2006 | Sands |
| 7,010,265 B2 | 3/2006 | Coffin |
| 7,013,238 B1 | 3/2006 | Weare |
| 7,015,925 B2 | 3/2006 | Ford et al. |
| 7,017,174 B1 | 3/2006 | Sheedy |
| D518,487 S | 4/2006 | MacKenzie et al. |
| D519,122 S | 4/2006 | MacKenzie et al. |
| D519,519 S | 4/2006 | Vong |
| D519,521 S | 4/2006 | Fong |
| 7,023,492 B2 | 4/2006 | Sullivan |
| 7,024,424 B1 | 4/2006 | Platt et al. |
| 7,026,964 B2 | 4/2006 | Baldwin et al. |
| 7,027,101 B1 | 4/2006 | Sloo et al. |
| 7,028,325 B1 | 4/2006 | Rui et al. |
| 7,030,886 B2 | 4/2006 | Ford et al. |
| 7,032,177 B2 | 4/2006 | Novak et al. |
| 7,034,776 B1 | 4/2006 | Love |
| 7,034,927 B1 | 4/2006 | Allen et al. |
| 7,035,355 B2 | 4/2006 | Lais et al. |
| 7,035,526 B2 | 4/2006 | Green |
| 7,036,083 B1 | 4/2006 | Zenith |
| 7,036,090 B1 | 4/2006 | Nguyen |
| 7,036,091 B1 | 4/2006 | Nguyen |
| 7,036,092 B2 | 4/2006 | Sloo et al. |
| 7,036,138 B1 | 4/2006 | Tash |
| 7,038,690 B2 | 5/2006 | Wilt et al. |
| 7,039,935 B2 | 5/2006 | Knudson et al. |
| 7,042,526 B1 | 5/2006 | Borseth |
| 7,043,477 B2 | 5/2006 | Mercer et al. |
| 7,046,805 B2 | 5/2006 | Fitzhardinge et al. |
| 7,050,097 B2 | 5/2006 | Schick et al. |
| 7,050,867 B2 | 5/2006 | Maymudes |
| 7,051,111 B1 | 5/2006 | Scullin |
| 7,051,282 B2 | 5/2006 | Marcjan |
| 7,051,351 B2 | 5/2006 | Goldman et al. |
| 7,055,031 B2 | 5/2006 | Platt |
| 7,055,104 B1 | 5/2006 | Billmaier et al. |
| 7,058,720 B1 | 6/2006 | Majidimehr |
| 7,058,816 B2 | 6/2006 | Valeria |
| 7,058,936 B2 | 6/2006 | Chilimbi et al. |
| 7,065,553 B1 | 6/2006 | Chesley et al. |
| 7,069,284 B2 | 6/2006 | Peting |
| 7,069,576 B1 | 6/2006 | Knudson et al. |
| 7,071,968 B2 | 7/2006 | Novak |
| 7,073,118 B2 | 7/2006 | Greenberg et al. |
| 7,073,193 B2 | 7/2006 | Marsh |
| 7,076,202 B1 | 7/2006 | Billmaier |
| 7,076,734 B2 | 7/2006 | Wolff et al. |
| 7,076,792 B2 | 7/2006 | Zigmond et al. |
| 7,076,794 B2 | 7/2006 | Lieberman et al. |
| 7,080,394 B2 | 7/2006 | Istvan et al. |
| 7,088,910 B2 | 8/2006 | Potrebic et al. |
| 7,093,273 B2 | 8/2006 | Marsh |
| 7,098,868 B2 | 8/2006 | Love et al. |
| 7,099,952 B2 | 8/2006 | Wong et al. |
| 7,103,904 B1 | 9/2006 | Blackketter et al. |
| 7,103,905 B2 | 9/2006 | Novak |
| 7,103,908 B2 | 9/2006 | Tomsen |
| 7,107,532 B1 | 9/2006 | Billmaier et al. |
| 7,107,608 B2 | 9/2006 | Wagner et al. |
| 7,111,320 B1 | 9/2006 | Novak |
| 7,116,894 B1 | 10/2006 | Chatterton |
| 7,117,439 B2 | 10/2006 | Barrett et al. |
| 7,127,127 B2 | 10/2006 | Jojic et al. |
| 7,130,846 B2 | 10/2006 | Danker et al. |
| 7,131,054 B2 | 10/2006 | Greenberg et al. |
| 7,142,230 B2 | 11/2006 | Novak et al. |
| 7,146,632 B2 | 12/2006 | Miller |
| 7,155,675 B2 | 12/2006 | Billmaier et al. |
| 7,155,734 B1 | 12/2006 | Shimomura et al. |
| 7,158,531 B2 | 1/2007 | Barton |
| 7,159,176 B2 | 1/2007 | Billmaier et al. |
| 7,159,177 B2 | 1/2007 | Billmaier et al. |
| 7,161,877 B2 | 1/2007 | Lai et al. |
| 7,161,994 B2 | 1/2007 | Shah et al. |
| 7,162,728 B1 | 1/2007 | Bahn |
| 7,165,264 B1 | 1/2007 | Westrick |
| 7,167,531 B2 | 1/2007 | Greenberg et al. |
| 7,194,511 B2 | 3/2007 | Stettner |
| 7,194,754 B2 | 3/2007 | Tomsen et al. |
| 7,197,234 B1 | 3/2007 | Chatterton |
| 7,197,715 B1 | 3/2007 | Valeria |
| 7,200,321 B2 | 4/2007 | Otala et al. |
| 7,200,859 B1 | 4/2007 | Perlman et al. |
| 7,203,952 B2 | 4/2007 | Broadus |
| 7,216,235 B1 | 5/2007 | Platt |
| 7,228,556 B2 | 6/2007 | Beach et al. |
| 7,236,204 B2 | 6/2007 | Perlman |
| 7,237,252 B2 | 6/2007 | Billmaier |
| 7,243,123 B1 | 7/2007 | Allen et al. |
| 7,245,817 B1 | 7/2007 | Nichols et al. |
| 7,251,255 B1 | 7/2007 | Young |
| 7,251,294 B2 | 7/2007 | Peting |
| 7,263,362 B1 | 8/2007 | Young et al. |
| D551,668 S | 9/2007 | Newby et al. |
| 7,266,832 B2 | 9/2007 | Miller |
| 7,266,835 B2 | 9/2007 | Halbert |
| 7,272,298 B1 | 9/2007 | Lang et al. |
| 7,272,657 B2 | 9/2007 | Allen et al. |

(56) References Cited

U.S. PATENT DOCUMENTS

| | | |
|---|---|---|
| D552,610 S | 10/2007 | Newby et al. |
| 7,302,696 B1 | 11/2007 | Yamamoto |
| 7,310,355 B1 | 12/2007 | Krein et al. |
| 7,313,802 B1 | 12/2007 | Tomsen |
| 7,313,808 B1 * | 12/2007 | Gupta et al. ............... 725/89 |
| 7,320,134 B1 | 1/2008 | Tomsen et al. |
| 7,320,137 B1 | 1/2008 | Novak et al. |
| 7,321,716 B1 | 1/2008 | Vallone et al. |
| 7,340,761 B2 | 3/2008 | Billmaier |
| 7,350,157 B1 | 3/2008 | Billmaier et al. |
| 7,360,232 B2 | 4/2008 | Mitchell |
| 7,380,260 B1 | 5/2008 | Billmaier et al. |
| 7,382,838 B2 | 6/2008 | Peting |
| 7,386,129 B2 | 6/2008 | Perlman |
| 7,391,808 B1 | 6/2008 | Farrand |
| 7,409,546 B2 | 8/2008 | Platt |
| 7,428,023 B2 | 9/2008 | Allen et al. |
| 7,434,246 B2 | 10/2008 | Florence |
| 7,440,523 B2 | 10/2008 | Lais et al. |
| 7,463,737 B2 | 12/2008 | Gillon et al. |
| 7,466,640 B2 | 12/2008 | Snow et al. |
| 7,484,234 B1 | 1/2009 | Heaton et al. |
| 7,487,459 B2 | 2/2009 | Billmaier et al. |
| 7,487,529 B1 | 2/2009 | Orlick |
| 7,493,015 B1 | 2/2009 | Van Stam et al. |
| 7,518,629 B2 | 4/2009 | Novak et al. |
| 7,529,465 B2 | 5/2009 | Barton et al. |
| 7,533,403 B1 | 5/2009 | Krein et al. |
| 7,543,325 B2 | 6/2009 | Westbrook et al. |
| 7,546,622 B2 | 6/2009 | Tash |
| 7,558,472 B2 | 7/2009 | Locket et al. |
| 7,573,529 B1 | 8/2009 | Perlman |
| 7,574,656 B2 | 8/2009 | Billmaier et al. |
| 7,590,240 B2 | 9/2009 | Platt et al. |
| 7,594,246 B1 | 9/2009 | Billmaier et al. |
| 7,650,569 B1 | 1/2010 | Allen et al. |
| 7,661,121 B2 | 2/2010 | Smith et al. |
| 7,665,111 B1 | 2/2010 | Barton et al. |
| 7,668,435 B2 | 2/2010 | Lockett et al. |
| 7,671,758 B1 | 3/2010 | Seidel et al. |
| 2001/0029610 A1 | 10/2001 | Corvin et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0073424 A1 | 6/2002 | Ward et al. |
| 2002/0108110 A1 * | 8/2002 | Wugofski ............... 725/38 |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0093790 A1 * | 5/2003 | Logan et al. ............... 725/38 |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2003/0221192 A1 | 11/2003 | Rappaport et al. |
| 2004/0010806 A1 | 1/2004 | Yuen et al. |
| 2004/0045025 A1 | 3/2004 | Ward et al. |
| 2004/0078814 A1 * | 4/2004 | Allen ............... 725/47 |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0226042 A1 * | 11/2004 | Ellis ............... 725/43 |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0188414 A1 * | 8/2005 | Shin ............... 725/115 |
| 2005/0216936 A1 | 9/2005 | Knudson et al. |
| 2005/0235319 A1 * | 10/2005 | Carpenter et al. ............... 725/52 |
| 2005/0251824 A1 | 11/2005 | Thomas et al. |
| 2006/0041915 A1 | 2/2006 | Dimitrova et al. ............... 725/81 |
| 2006/0053388 A1 * | 3/2006 | Michelman ............... 715/775 |
| 2006/0143653 A1 * | 6/2006 | Suh ............... 725/46 |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0050729 A1 * | 3/2007 | Kawamura et al. ............ 715/781 |
| 2007/0101291 A1 * | 5/2007 | Forstall et al. ............... 715/805 |
| 2007/0107010 A1 | 5/2007 | Jolna et al. |
| 2009/0125843 A1 | 5/2009 | Billmaier et al. |

* cited by examiner

CONTROL TOOLS FOR MEDIA CONTENT ACCESS SYSTEMS AND METHODS

BACKGROUND INFORMATION

The advent of computers, interactive electronic communication, the Internet, and other advances in the digital realm of consumer electronics have resulted in a great variety of programming, recording, and viewing options for users who view media content such as television programs. In implementing such enhanced programming, the set-top box (STB) has become an important computing device for accessing media content services and the media content within those services. In addition to supporting traditional analog broadcast video functionality, STBs also support an increasing number of two-way digital services such as video-on-demand, internet protocol television (IPTV), and personal video recording.

An STB is typically connected to a cable or satellite, or generally, a subscriber television system, and includes hardware and software necessary to provide the functionality of the subscriber television system at a user site. While many STBs are stand-alone devices that are externally connected to a television, an STB and/or its functionality may be integrated into a television or personal computer, a mobile device such as a mobile phone or a personal digital assistant (PDA), or even into an audio device such as a programmable radio, as is known.

An STB typically provides users with functionality for controlling certain settings and operations of the STB. In many instances, a user is provided with a large number of features and associated control options. However, the large number of control options often makes it difficult and/or inconvenient for the user to find and utilize a particular feature. For example, when a user of a conventional STB is viewing media content ("on video") caused to be displayed by the STB, the control options immediately available to the user are limited. That is, the user does not have convenient access to many STB control options from an "on-video" screen and/or while the media content continues to be presented. In many cases, the user is forced to leave a presentation of media content (e.g., go "off video") in order to find a desired control option, menu, or feature. This can be frustrating to a user, especially where the user wishes to continue viewing media content (i.e., the media content remains "on video") while also having access to a wide range of control options.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Figure 1:
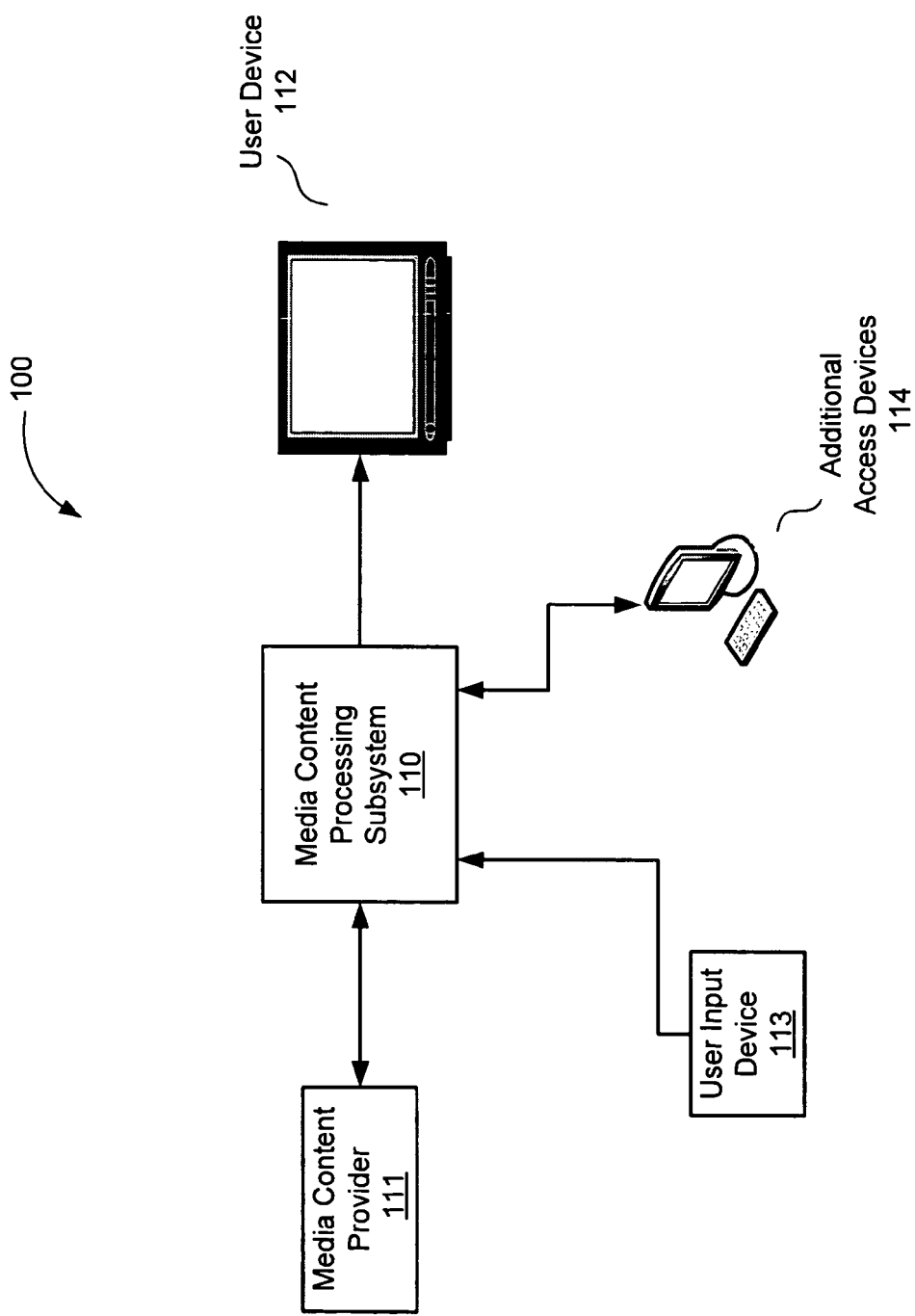
FIG. 1 illustrates an example of a media content access system, according to an embodiment.

Preferred exemplary systems and methods for providing control tools together with a presentation of media content are described herein. The control tools may be included in a group of control panes, each of which is configured to be presented together with a presentation of a media content instance in response to an input command. A control pane can be presented generally without obstructing the presentation of the media content instance, such that a user has convenient access to a wide range of control tools while also being able to continue experiencing the presentation of media content.

As used herein, the term "media content instance" will be used to refer generally to any television program, on-demand program, pay-per-view program, broadcast media program, video-on demand program, commercial, advertisement, video, multimedia, movie, song, photograph, audio programming, network services (e.g., Internet), or any segment, portion, component, or combination of these or other forms of media content that may be presented to and experienced (e.g., viewed) by a user. A media content instance may have one or more components. For example, an exemplary media content instance may include a video component and an audio component.

The exemplary systems and methods described herein enable a user of a set-top box (STB) or other user device to conveniently launch at least one control pane during presentation of a media content instance. For example, a user may launch a control pane from an "on-video" screen displaying a media content instance (or a component of a media content instance). The control pane may be presented for consideration by the user such that the presentation of the control pane generally does not obstruct the presentation of the media content instance. Accordingly, the user is able to continue experiencing the presentation of the media content instance while also accessing control tools included in the control pane.

A control pane may be selected from a group of control panes for presentation to the user. Each of the control panes may include a different set of control tools, and the selection of a particular control pane for presentation may be based on an input command initiated by the user. This allows the user to conveniently access and utilize a wide range of control tools from an "on-video" screen by issuing commands configured to cause corresponding control panes to be presented together with the presentation of media content. The accessibility of multiple different control panes having different control options provides the user with access to a large number and broad range of control tools. In certain embodiments, at least some of the control tools are directly accessible from an "on-video" screen, without having to navigate through intervening screens or menus.

At least some of the control tools may be contextual in nature, meaning that the control tools can be selected and/or configured (i.e., changed) based on media content, user preferences and permissions, or other suitable criteria. For example, certain control tools may be identified for inclusion in the control panes based on which user profile is active or on an attribute of the media content being presented. Accordingly, control tools included in control panes may change dynamically as contextual attributes such as attributes associated with user profiles and media content change.

The control tools may include one or more tools providing the user with access to functionality and/or information that can compliment and enhance the experience of the user. As used herein, the term "control tools" will be used to refer generally to any, control, mechanism, icon, link, shortcut, or other tool providing access to functionality and/or information including, but not limited to, controlling operations and/or settings of a user device (e.g., an STB), controlling presentation of media content, recording media content, rating media content, recommending media content to another user, managing a list of user preferences (e.g., adding a media content instance to a list of favorites), flagging media content or a snippet (e.g., a scene) of the media content, sharing media content or a snippet of the media content with another user, accessing advertisements (e.g., telescoping advertisements) associated with sponsors of media content, accessing additional information associated with media content, accessing information and/or information widgets (e.g., a weather widget, a traffic widget, a task management widget, a package shipping widget, a calendar widget, etc.), accessing additional functionality (e.g., an electronic mail or other messaging application, a calendar application, a package shipping application, etc.), managing user profiles (e.g., selecting between different aliases associated with user profiles to switch between the user profiles), managing parental control features, applying parental control functions to media content, scheduling operations to be performed (e.g., selecting media content to be recorded), receiving selected notifications (e.g., notifications related to electronic mail, instant messaging, voice mail, advertisements, promotions, security), accessing information and/or other media content related to a media content instance being presented, and accessing network-specific or channel-specific program guide information. As described further below, control tools may include shortcuts to additional information and/or functionality, including information and/or functionality provided by third parties. Examples of several control tools are described herein. However, the description of exemplary control tools is illustrative and not limiting.

The above-mentioned functionalities of flagging and sharing of media content or snippets of media content may be performed as described in U.S. patent application Ser. No. 11/474,992, by Heath Stallings et al., entitled MEDIA CONTENT ACCESS SYSTEMS AND METHODS, filed Jun. 27, 2006, and U.S. patent application Ser. No. 11/474,991, by Heath Stallings et al., entitled SNIPPET ACCESS SYSTEMS AND METHODS, filed Jun. 27, 2006, the content of which is hereby incorporated by reference in its entirety.

Components and functions of exemplary embodiments of set-top-box control systems and methods will now be described in more detail.

II. Exemplary System View

FIG. 1 illustrates an example of a media content access system 100, according to one embodiment. Media content access system 100 may take many different forms and include multiple and/or alternate components and facilities.

As shown in FIG. 1, a media content processing subsystem 110 is configured to communicate with and receive a data stream (i.e., a media content stream) containing a media content instance from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, and other suitable communications networks and technologies.

The media content processing subsystem 110 is configured to process the media content stream provided by the media content provider 111 and provide a signal to a user device 112 so that the user device 112 may present the media content. In this manner, the media content processing subsystem 110 may cause a media content instance to be presented for experiencing by a user of the media content processing subsystem 110. The presentation of the media content instance may include, but is not limited to, displaying, playing back, or otherwise processing the media content instance, or one or more components of the media content instance, such that it may be experienced by the user. For example, the media content processing subsystem 110 may cause a component of a media content instance to be displayed for viewing by the user. As will be described in more detail below, the media content processing subsystem 110 may be controlled by a user input device 113 and/or a number of additional access devices 114.

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider

Media content provider 111 is configured to provide various types of media content via a satellite, cable system, subscriber television network, the Internet, optical fiber network, wireless network, or any other suitable network. The media content may include, but is not limited to, any of the forms of media content instances described above.

Figure 2:
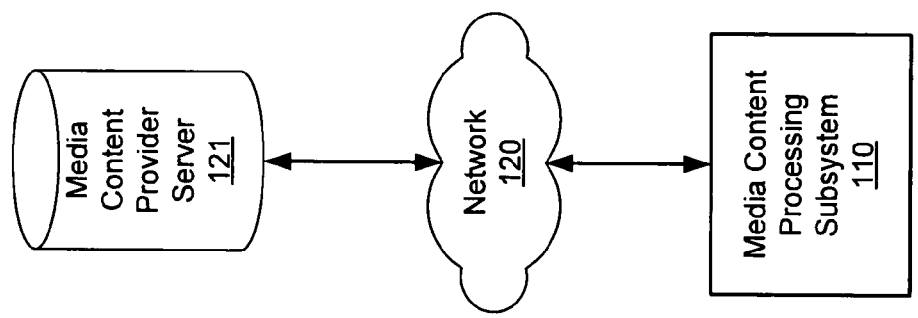
FIG. 2 is an illustration of an exemplary media content provider network, according to an embodiment.

An exemplary media content provider 111 includes a media content provider server 121, as shown in FIG. 2. The media content provider server 121 may be configured to communicate with the media content processing subsystem 110 via one or more types of networks 120 (and communications links thereto). The network 120 shown in FIG. 2 may include the Internet, an intranet or other private packet-switched network, a cable television network (e.g., a hybrid fiber-coax network), a wireless broadcast network (e.g., a satellite media broadcasting network or terrestrial broadcasting network), a telephone network, a provider-specific network (e.g., a Verizon® FIOS® network and/or a TiVo® network), an optical fiber network, or any other suitable network. In some alternative examples, the processing subsystem 110 may be connected directly to the media content provider server 121. While FIG. 2 shows a single media content provider server 121, in other embodiments, the media content provider 111 may include multiple media content servers.

B. User Device

As mentioned, the processing subsystem 110 may be communicatively coupled to a user device 112 configured to present (e.g., display, play, or otherwise experience) the media content. The user device 112 may include, but is not limited to, a display device (e.g., a display screen), a television, computer monitor, handheld device, speaker, or any other device configured to present the media content. As is well known, the user device 112 may receive and process output signals from the media content processing subsystem 110 such that content of the output signals is received for experiencing by the user.

While FIG. 1 illustrates the user device 112 as being a device separate from and communicatively coupled to the media content processing subsystem 110, this is exemplary only and not limiting. In other embodiments, the user device 112 and the media content processing subsystem 110 may be integrated into one physical device. For example, the user device 112 may include a display device (e.g., a display screen) integrated in the media content processing subsystem 110.

C. Media Content Processing Subsystem

Figure 3:
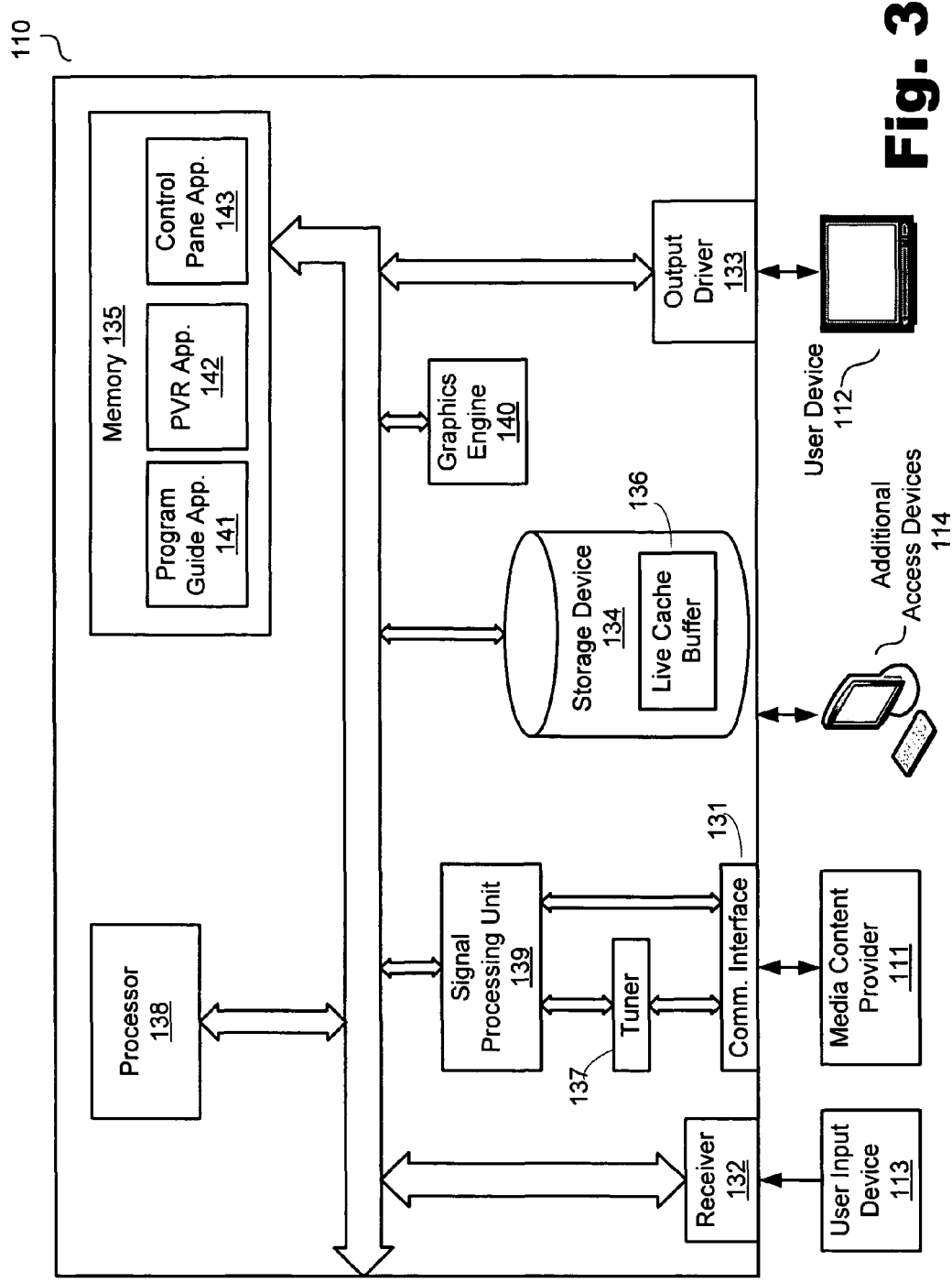
FIG. 3 is a block diagram of an exemplary media content processing subsystem, according to an embodiment.

FIG. 3 is a block diagram of an exemplary media content processing subsystem 110 (or simply "processing subsystem 110") according to an exemplary embodiment. The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible receivers that receive and decode digital and/or analog media content. Hence, an exemplary processing subsystem 110 may include, but is not limited to, a set-top box (STB), home communication terminal (HCT), digital home communication terminal (DHCT), stand-alone personal video recorder (PVR), digital video disc (DVD) player, video-enabled phone, and personal computer.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the Unix operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface 131 configured to receive media content from the media content provider 111. The processing subsystem 110 may also include a receiver 132 configured to receive input commands from a user input device 113. The user input device 113 may include, for example, a remote control, keyboard, or any other suitable input device and may be configured to communicate with the receiver 132 via a wireless link (e.g., an IR link), electrical connection, or any other suitable communication link.

Figure 4:
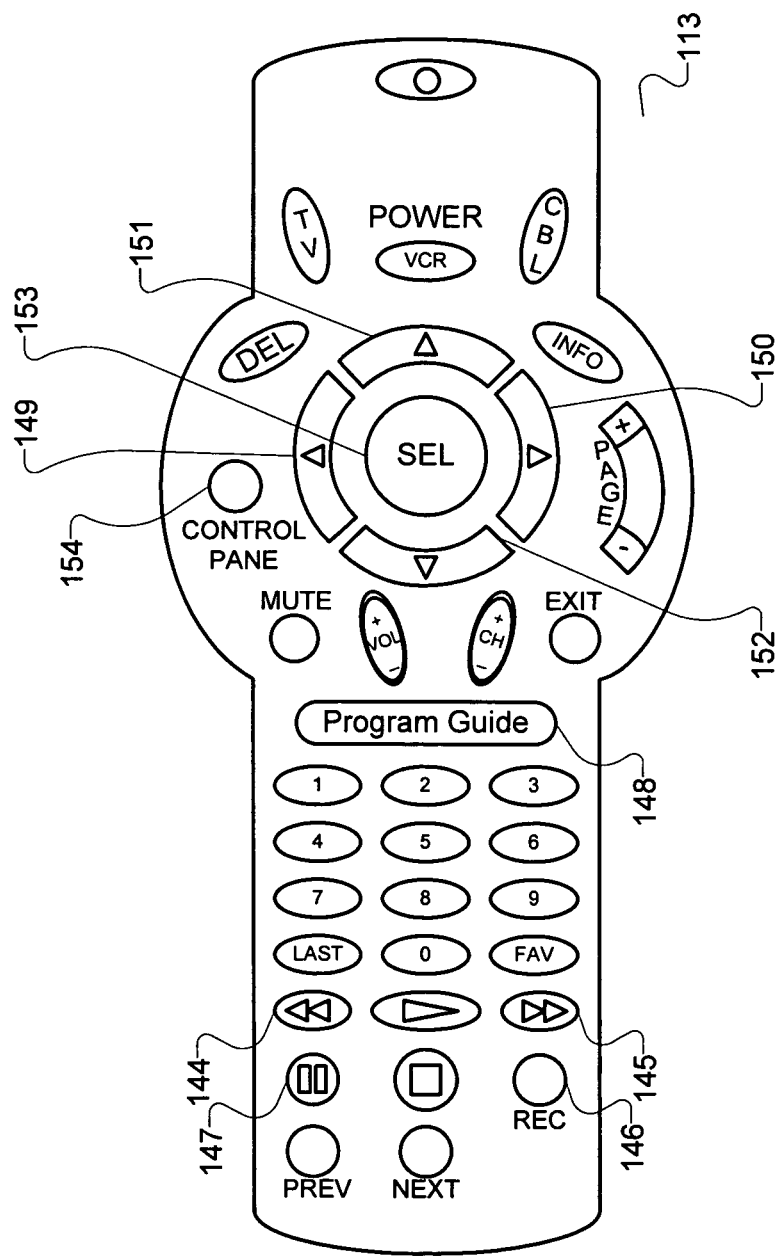
FIG. 4 illustrates an exemplary remote control user input device, according to an embodiment.

An exemplary remote control user input device 113 is illustrated in FIG. 4. In some examples, the input device 113 may be configured to enable a user to provide various commands and other input signals for controlling various settings and operations of the processing subsystem 110, including control options related to the viewing of the media content. For example, rewind 144 and fast-forward buttons 145 enable a user to access different scenes or frames within media content stored in a live cache buffer 136 (described below in relation to FIG. 3). A record button 146 may also be included which enables the user to designate as permanently recorded any media content instance buffered in the live cache buffer 136. A pause button 147 may enable the user to pause a media content instance. A program guide button 148 may be configured to evoke the display of a program guide on the user device 112. A "left arrow" button 149, "right arrow" button 150, "up arrow" button 151, and "down arrow" button 152 may be included and configured to enable the user to navigate through various views and menus displayed by the user device 112.

As described below, certain buttons of the input device 113 may be configured as shortcuts (e.g., hot keys) to menus of control tools. For instance, during certain operations of the processing subsystem 110, the arrow buttons 149-152 of the input device 113 may be configured as dedicated buttons associated with corresponding control panes including control tools, as described further below. From an "on video" screen, for example, selection of the "up arrow" button 151 may be configured to cause a corresponding control pane to be displayed within the viewing screen of the user device 112 and generally adjacent to a display of media content.

A button on the input device 113, such as the select button 153 or control pane button 154, may be configured to provide the user with the ability to enable or disable a control pane application. The input device 113 shown in FIG. 4 is merely illustrative of the many different types of user input devices that may be used in connection with the present systems and methods.

Returning to FIG. 3, a number of additional access devices 114 may also be configured to communicate with the processing subsystem 110. These access devices 114 may include, but are not limited to, personal computers and mobile devices (e.g., laptops, personal digital assistants (PDAs), cellular phones, etc.). In some examples, as will be described in more detail below, the access devices 114 may be configured to access content stored and/or processed by the processing subsystem 110. For example, media content that has been recorded by the processing subsystem 110 may be accessed and viewed on a personal computer. Moreover, similar to the uses of the input device 113 described herein, the additional access devices 114 may also be used to program or otherwise control the settings and operations of the processing subsystem 110.

The processing subsystem 110 may also include an output driver 133 configured to interface with or drive the user device 112. The output driver 133 may include one or more drivers configured to interface with or drive one or more different output devices, including video and audio devices. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. As will be described in more detail below, various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem 110 may also include memory 135. Memory 135 may include, but is not limited to, FLASH memory, random access memory (RAM), dynamic RAM (DRAM), or a combination thereof. In some examples, as will be described in more detail below, various applications (e.g., a PVR application) used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. As will be described in more detail below, media content data may be temporarily stored in the live cache buffer 136 to facilitate viewing of the media content in one or more trick play modes.

3. Tuner

Tuner 137 is configured to tune to a particular media (e.g., television) channel, stream, address, frequency or other carrier in order to process media content that is transmitted on that carrier. In some examples, the tuner 137 may include multiple tuners such that multiple carriers of media content may be processed and/or presented by (e.g., displayed by) a user device 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether it is to be deleted. As used herein, the term "permanent recording" will be understood to mean media content that is stored for an extended period of time as decided by the user.

While tuner 137 may be used to receive various types of media-content-carrying signals broadcast by media content provider 111, media content processing subsystem 110 may be configured to receive other types of media content signals from the media content provider 111 without using a tuner. For example, media content provider 111 may broadcast digital streams of data packets (e.g., Internet Protocol (IP) based data packets) that can be received without using a tuner. For such types of media content signals, the communication interface 131 may receive and forward the signals directly to the signal processing unit 139 without going through the tuner 137. For an IP media content signal, for example, the signal processing unit 139 may function as an IP receiver.

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

The processing subsystem 110 may also include a graphics engine 140 configured to generate graphics that are to be displayed by the user device 112. The graphics may include, but are not limited to, views of media content instances (e.g., "on-video" screen views), components of media content instances, program guides, progress bars, control panes, control tools included in the control panes, and other graphics.

One or more processors of the processing subsystem 110 (e.g., processor 138 and/or graphics engine 140) may generate and provide output signals configured to cause the user device 112 to present contents (e.g., a media content instance and/or control panels) of the output signals. Output signals may be provided to the user device 112 by way of the output driver 133.

5. Application Clients

One or more applications 141-143 residing within the processing subsystem 110 may be executed upon initiation by a user of the processing subsystem 110. The applications 141-143, or application clients, may reside in memory 135 or in any other area of the processing subsystem 110 and be executed by the processor 138.

As shown in FIG. 3, one of the applications may be a program guide application 141 configured to generate a program guide that is displayed on the user device 112. An exemplary program guide includes a graphical user interface (GUI) that performs various functions including allowing a user to select and view program information associated with various media content instances.

The processing subsystem 110 may also include a personal video recording (PVR) application 142. A PVR application is also referred to as a digital video recording (DVR) application. As used herein and in the appended claims, unless otherwise specifically denoted, the term "PVR application" will be used to refer to any application and/or device configured to record media content and/or provide for the viewing of media content in normal or trick play mode. As previously mentioned, trick play modes include, but are not limited to, slow motion, fast motion, reverse play, fast forward play, instant replay, jumping, pausing of live broadcast, and scanning. The PVR application 142 may also provide for media content recording functionality by enabling the temporary and/or permanent recording of media content to the storage device 134.

In some examples, the PVR application 142 may be integrated into the processing subsystem 110, as shown in FIG. 3, or it may be a stand-alone unit. A stand-alone PVR may be coupled to the processing subsystem 110 or it may be used in place of the processing subsystem 110. In the examples contained herein, it will be assumed that the PVR application 142 is integrated into the processing subsystem 110 for illustrative purposes only.

The processing system 110 may also include a control pane application 143, which may be initiated automatically upon the occurrence of a predefined event or by a user of the processing subsystem 110. For example, the user may actuate a button of the input device 113 or other suitable input mechanism (e.g., an access device 114) to cause an input signal to be sent to the processor subsystem 110, which receives and responds to the input signal by executing the control pane application 143, or at least certain operations included in the control pane application 143. In certain embodiments, actuation of the "control pane" button 154 of the input device 113 during presentation of a media content instance (e.g., an "on-video" display of a video component of the media content instance) is configured to toggle between enabling and closing the control pane application 143.

In certain embodiments, select buttons of the input device 113 may be preprogrammed for initiating pre-associated functions of the control pane application 143. For example, a first button (e.g., the "up arrow" button 151) may be pre-associated with a first control pane, a second button (e.g., the "right arrow" button 150) may be pre-associated with a second control pane, etc., such that a selection of a particular button is configured to launch the corresponding control pane. Accordingly, when the control pane application 143 is executing (i.e., has been launched but not yet terminated) during presentation of media content, certain predefined buttons of the input device 113 may be configured to act as "hot keys" for initiating certain control pane operations, including launching corresponding control panes for consideration by the user.

The control pane application 143 and associated control panes provide the user with convenient, and in certain embodiments direct access to control tools included in the control panes. Significantly, the user is able to access, navigate, consider, and utilize control tools to enhance and/or compliment her viewing experience, while a media content instance being presented continues to be presented. For example, the user is able to launch a control pane and use the control tools included therein, without having to leave the presentation of the media content instance.

In certain embodiments, the control pane application 143 is configured to cause a control pane to be displayed along an edge of a media content instance (or a component of the media content instance) currently being displayed. The control pane may be displayed such that the display of the media content instance (or component of the media content instance) is generally unobstructed. For example, the displayed component of the media content instance may remain viewable, or at least substantially viewable, by the user. In certain embodiments, for example, the control pane "peeks in" from an outer edge of the viewing screen of the user device 112 and the display of the media content instance is resized to make room for the control pane.

As mentioned above, at least some of the control tools may be contextual in nature. Certain control tools may be contextually selected for inclusion in the control panes based on which user profile is active or on an attribute of the media content being presented. A user profile may include settings, preferences, or permissions that affect the availability, selection, function, or content of control tools. For instance, a particular user profile (e.g., a parent user profile) may have permissions providing access to control tools for locking another user profile (e.g., a child user profile) out of a particular media content instance, and the other user profile may have permissions that do not allow access to these tools. Consequently, when a control pane is launched from the first user profile, the control pane may contextually include a parental control tool, while a control pane launched from the other user profile may contextually not include the parental control tool. The dependency of the control tools on user profiles enables users to customize their control tools for their respective user profiles.

Similarly, controls tools may be selected or configured based on attributes of the media content being presented. For example, a control tool providing access to a portal specific to a programming channel may be different for different programming channels. For instance, when a media content instance being presented is provided by a FOX programming channel, a programming channel tool may provide access to a portal specific to the FOX channel. The programming channel tool may automatically and dynamically change (or be replaced by a different programming channel tool) to provide access to a different portal in response to a channel change. The contextual nature of control tools enables user-specific and/or media-specific control tools to be dynamically selected and provided in control panes.

Figure 5:
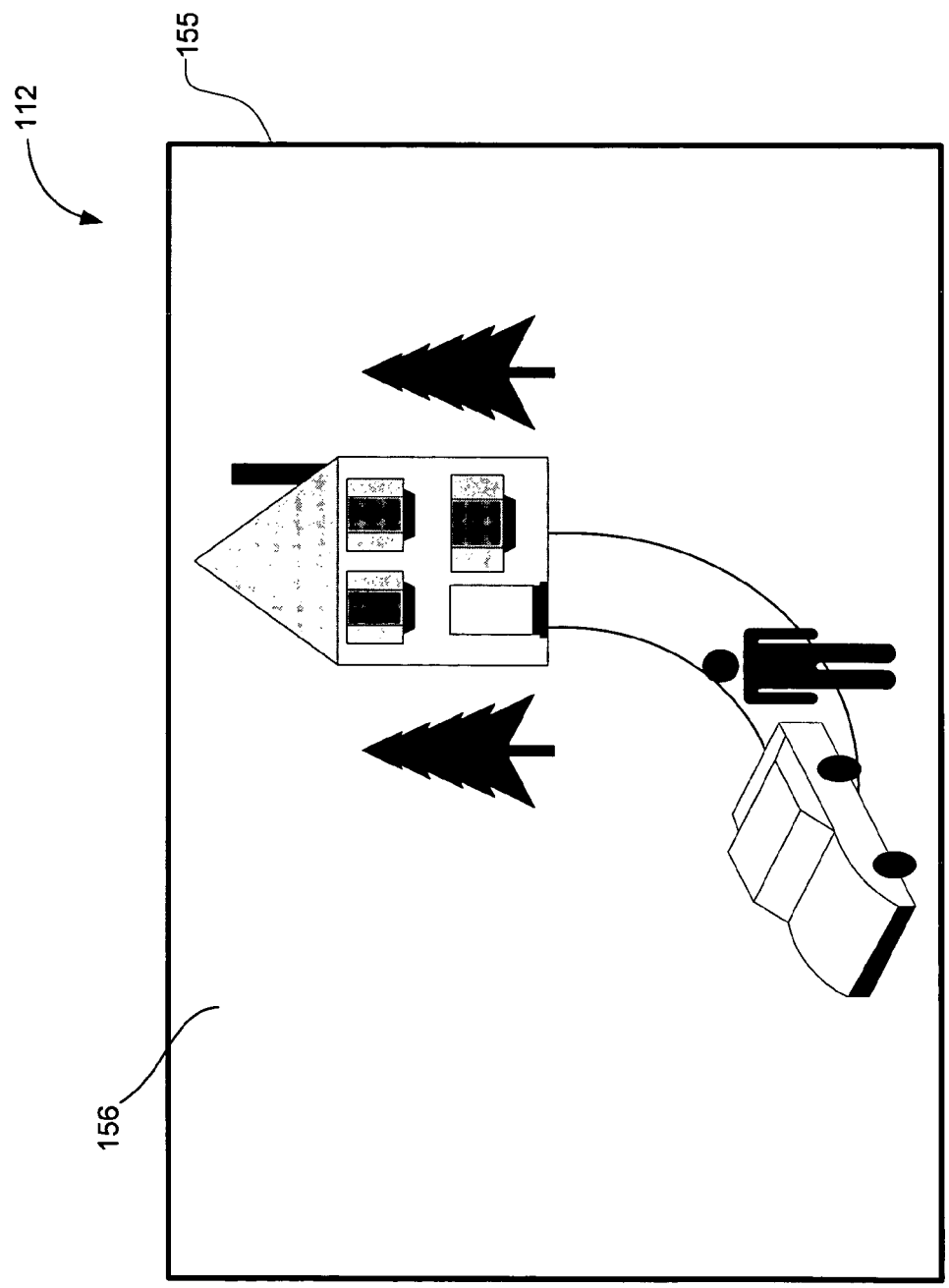
FIG. 5 illustrates a viewing screen of an exemplary display device with a particular scene or frame of media content displayed thereon, according to an embodiment.

To facilitate an understanding of the control pane application 143, FIGS. 5-11 illustrate various embodiments of views caused to be displayed on the user device 112 by the processing subsystem 110. FIG. 5 illustrates a viewing screen 155 of an exemplary user device 112 with a particular scene or frame of media content displayed thereon. The display of media content shown in FIG. 5 is indicated as reference number 156. As shown in FIG. 5, the media content is displayed substantially "full size" within the viewing screen 155, which is commonly referred to as an "on video" display.

In some instances, a user may be interested in accessing, viewing, navigating, and/or using various control tools while continuing to view media content being presented (e.g., displayed). In certain embodiments, while the media content is being displayed "on-video", the user may conveniently select a pre-configured button on the input device 113, or provide some other form of input, in order to launch a control pane having one or more control tools included therein. In certain embodiments, the directional arrows of the input device 113 are configured to initiate access to corresponding control panes, as described further below. The control pane application 143 may be executed as described above to cause one or more control panes to be displayed within the viewing screen 155 together with the media content being displayed.

In certain embodiments, the control pane may be selected from a group of control panes based on the input command initiated by the user. Accordingly, the user may be provided with both access to a plurality of control panes and controls for selecting from the control panes a particular control pane to be presented.

Figure 6:
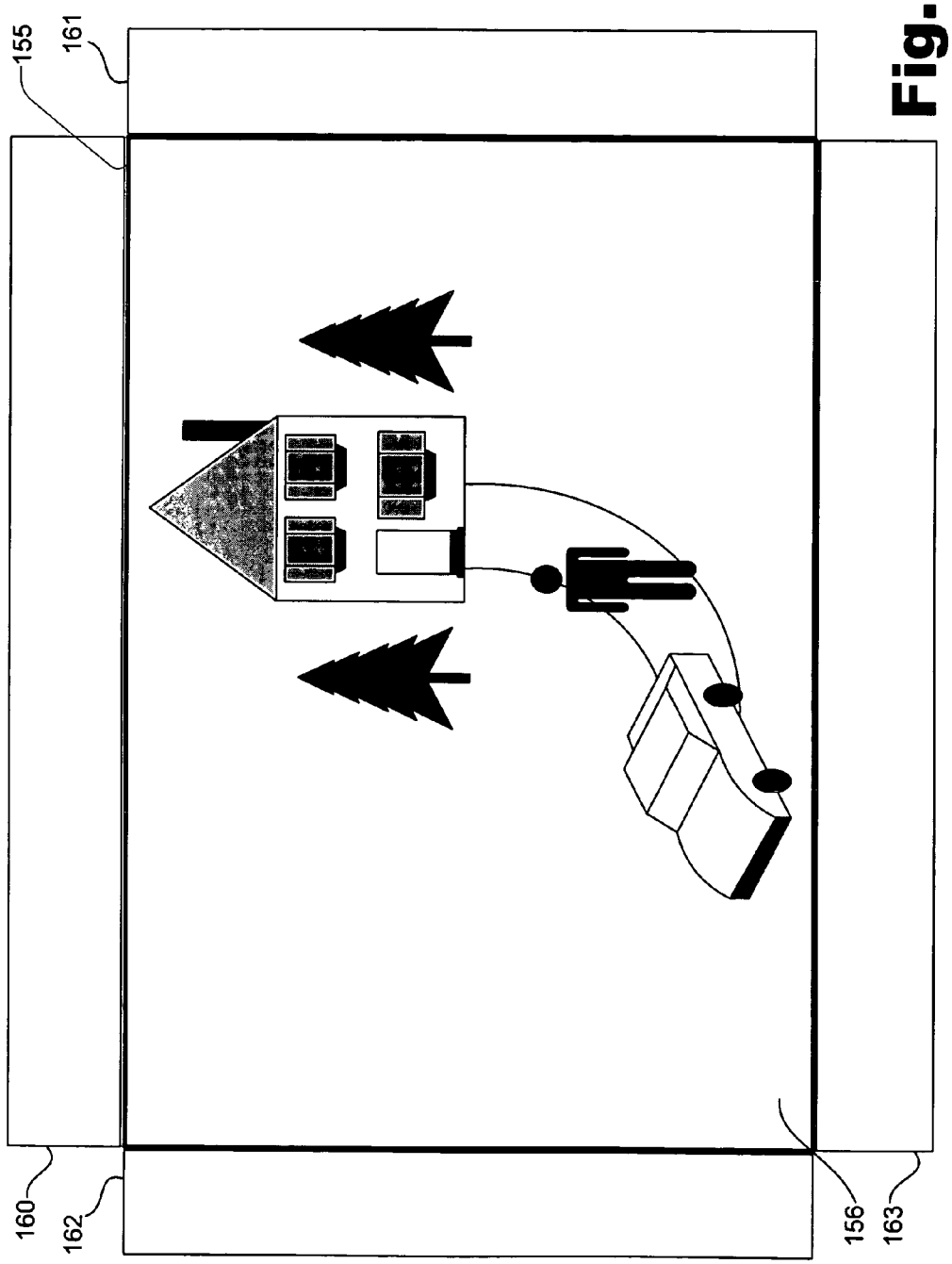
FIG. 6 illustrates the viewing screen of FIG. 5 with a group of control panes positioned off-screen, according to an embodiment.

FIG. 6 illustrates the viewing screen 155 of FIG. 5 with a group of exemplary control panes 160-163 positioned at least substantially off-screen (i.e., out of view), according to an embodiment. As shown, the control panes 160-163 may be outside of the viewing screen 155 during an "on video" display of media content. Each of the control panes 160-163 may be positioned along a different edge of the media content display 156. The control panes 160-163 may include graphical user interfaces configured to be presented to a user (e.g., placed within the viewing screen 155) when launched by the control pane application 143.

Although not shown in FIG. 6, each of the control panes 160-163 may include one or more control tools, examples of which will be described further below in relation to FIGS. 7-11. In certain embodiments, each of the control panes 160-163 includes a unique (i.e., different) set of control tools. For example, control pane 160 may include a first set of control tools, and control pane 161 may include another set of different control tools. Accordingly, the user is able to select one of the control panes 160-163 to be presented depending on the location of a particular control tool that the user desires to access.

In certain embodiments, each of the control panes 160-163 includes a different type of control tools. Accordingly, the user is able to select one of the control panes 160-163 to be presented depending on the type of control tools that the user desires to access. Examples of types or categories of control tools include, but are not limited to, notification control tools, user profile control tools, shortcut control tools, and contextual control tools that are specific to the media content instance being presented. Examples of these types of control tools will be described further below.

When the occurrence of a predefined event (e.g., the user actuating a preconfigured button of the input device 113) is detected by the processing subsystem 110 during the presentation of a media content instance (e.g., an "on video" presentation such as that shown in FIG. 5), the control pane application 143 may cause a pre-associated one of the control panes 160-163 to be presented in the viewing screen 155 together with a display of the media content instance. This may be performed in any suitable manner and using any acceptable technologies.

In certain embodiments, for example, a common graphical interface layer including both the media content instance and control panes may be adjusted (e.g., moved about) relative to the viewing screen 155. For instance, the control panes 160-163 may be stitched to the edges of the media content display 156, each of which is disposed on the common graphical interface layer. The contents included within the viewing screen 155 may be adjusted by changing a "zoom" level (e.g., zooming out to make the contents of the graphical interface layer smaller in size) associated with and/or shifting the graphical interface layer (e.g., shifting it vertically, horizontally, or a combination of vertically and horizontally) to place selected content at least substantially within the viewing screen 155 for viewing by the user. In this manner, a selected control pane may be caused to "peek in" from an edge of the viewing screen 155. Of course, other embodiments may utilize other suitable processes and technologies to present the selected control pane in the viewing screen 155 together with the media content display 156.

Figure 7:
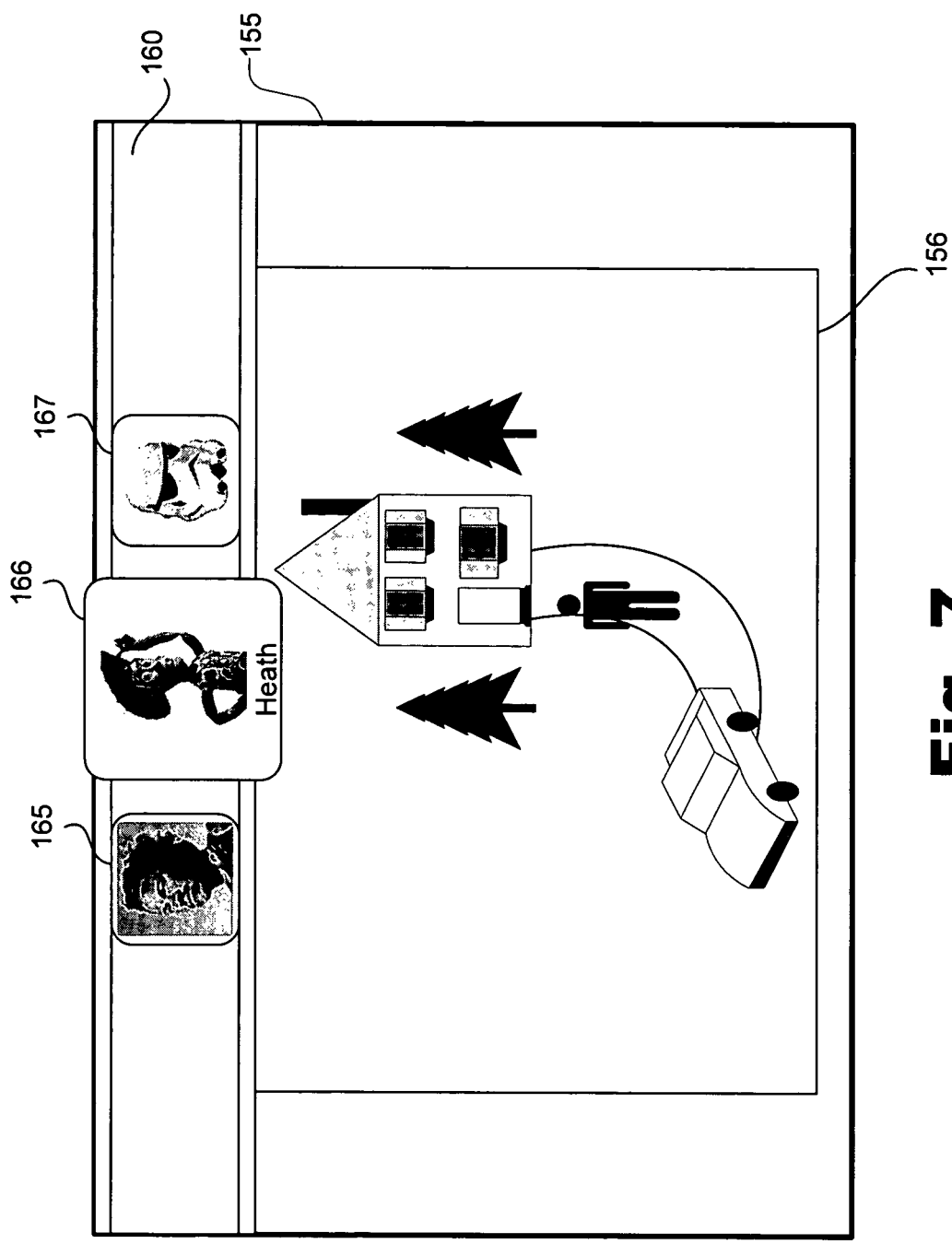
FIG. 7 illustrates the viewing screen of FIG. 5 with a first control pane displayed within the viewing screen and adjacent to a first edge of a display of media content, according to an embodiment.

FIG. 7 illustrates the viewing screen 155 of FIG. 5 with a first control pane 160 displayed within the viewing screen 155 and adjacent to a first edge of media content display 156, which has been resized and shifted to make room for the control pane 160 in the viewing screen 155. The control pane 160 may be inserted in the viewing screen 155 and presented as shown in FIG. 7 in response to a detection of any suitable predefined event, including a user providing a predefined input signal (e.g., an actuation of the "up arrow" button 151 of the input device 113).

As shown in FIG. 7, control pane 160 may include a first set of control tools 165-167 that are navigable and selectable by a user. In certain embodiments, when control pane 160 is presented in the viewing screen 155, the "left arrow" button 149 and "right arrow" button 150 of the input device 113 are configured for navigating (e.g., scrolling) through the control tools 165-167. As a user navigates through the control tools 165-167, the currently selected control tool may be indicated as being selected in any suitable way, including magnification of an icon representative of the control tool. As shown in FIG. 7, when control tool 166 is selected, it may be magnified in size as compared to control tools 165 and 167. The "select" button 153 of the input device 113 may be configured for activating the selected control tool.

The set of control tools 165-167 included in the control pane 160 may include any type of control tool, including any of the control tools described herein. In the embodiment of FIG. 7, control tools 165-167 are configured to enable a user to select from a set of preconfigured user profiles. The set of control tools 165-167, which may be referred to as alias controls or user profile controls, enable a user of the processing subsystem 110 to conveniently switch between different user profiles while continuing to view the media content instance being displayed. In other words, the media content can remain displayed within the viewing screen 155 while the user launches control pane 160 and utilizes the control tools 165-167 included therein.

In certain embodiments, when control pane 160 is presented in the viewing screen 155, the "down arrow" button 152 of the input device 113 is configured to cause the control pane 160 to go off screen. Upon selection of the "down arrow" button 152, for example, the display configuration presented in the viewing screen 155 may return from that shown in FIG. 7 to that shown in FIG. 5.

Figure 8:
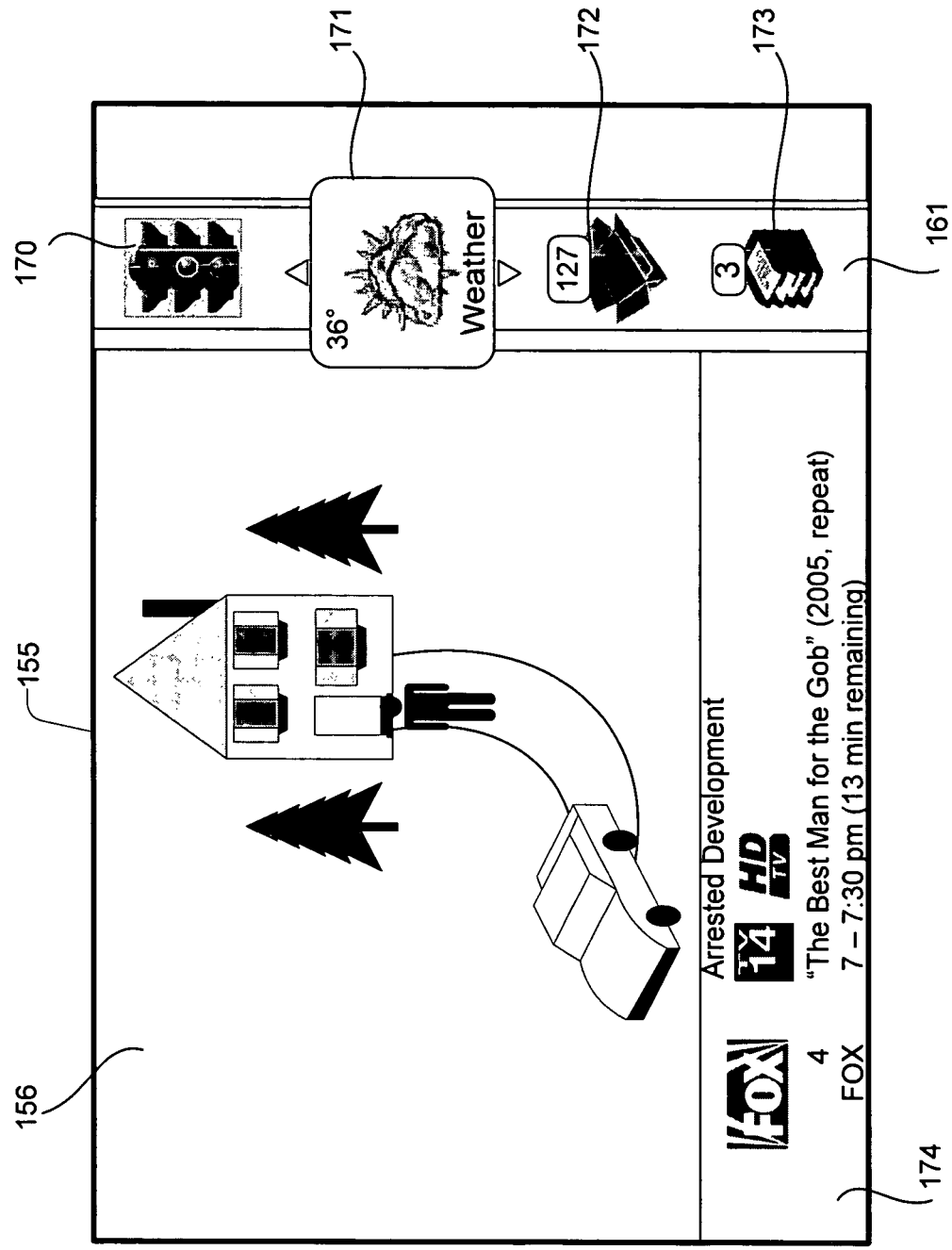
FIG. 8 illustrates the viewing screen of FIG. 5 with a second control pane displayed within the viewing screen and adjacent to a second edge of a display of media content, according to an embodiment.

Of course, the user may conveniently select any of the control panes 160-163 for presentation in the viewing screen 155. FIG. 8 illustrates the viewing screen 155 of FIG. 5 with a second control pane 161 displayed within the viewing screen 155 and adjacent to a second edge of a media content display 156, which has been resized and shifted to make room for the control pane 161 in the viewing screen 155. The control pane 161 may be inserted in the viewing screen 155 and presented as shown in FIG. 8 in response to a detection of any suitable predefined event, including a user providing a predefined input signal (e.g., an actuation of the "right arrow" button 150 of the input device 113).

As shown in FIG. 8, control pane 161 may include a second set of control tools 170-173 that are navigable and selectable by a user. The set of control tools 170-173 included in the control pane 161 may include any type of control tool, including any of the control tools described herein. In the embodiment of FIG. 8, control tools 170-173 include shortcuts for accessing additional information and/or functionality, including information and/or functionality provided by the media provider 111 or by one or more third parties, including third parties operating servers or other suitable devices connected to the processing subsystem 110 or the media content provider server 121 by the network 120 or some other communication technology.

Examples of shortcut control tools include, but are not limited to, a traffic widget 170, a weather widget 171, a package shipping widget 172, and a task management widget 173. The set of control tools 170-173, which may be referred to generally as shortcut control tools, enable a user of the processing subsystem 110 to conveniently access additional information and/or functionality (e.g., software applications, web services, etc.), including information and/or functionality provided by third parties, while the media content instance continues to be displayed in the viewing screen 155.

Figure 9:
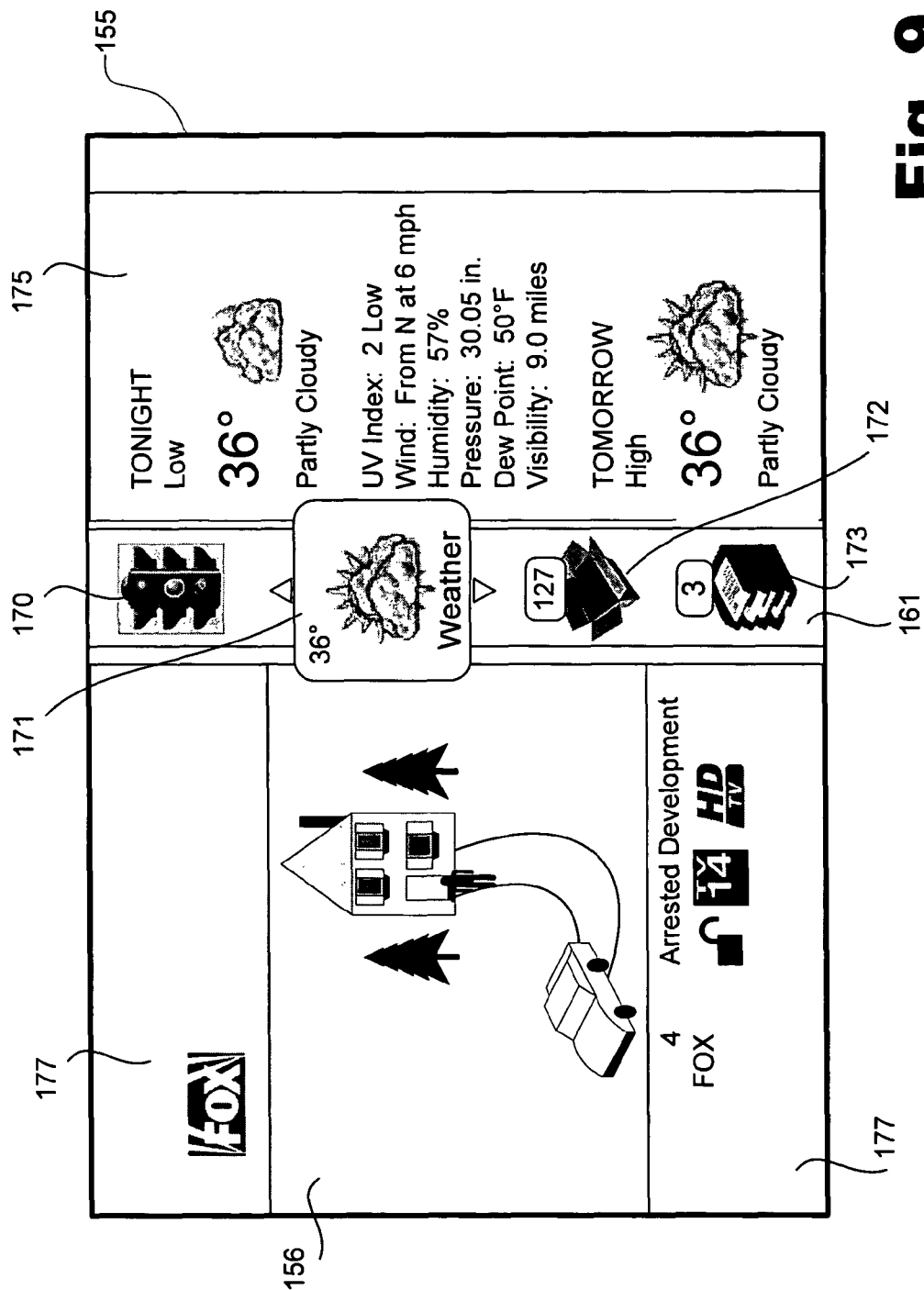
FIG. 9 illustrates the viewing screen of FIG. 5 with the second control pane of FIG. 8 extended into the viewing screen to make room for an application pane in the viewing screen, according to an embodiment.

If a user activates weather widget 171, for example, the display configuration within the viewing screen 155 may be adjusted for presentation of weather information and/or functionality that have been pre-associated with the weather widget 171. FIG. 9 illustrates the viewing screen 155 of FIG. 8 with control pane 161 extended further into the viewing screen 155 to make room for application pane 175, which in this case includes weather information. The media content display 156 may be resized and shifted again to accommodate both control pane 161 and application pane 175 within the viewing screen 155. Accordingly, a user is able to access and consider weather information (including weather information provided by a third party) while still experiencing a presentation of media content. The weather information included in application 175 is illustrative only. Other embodiments of application panes pre-associated with other shortcut control tools may include different information and/or functionality.

In certain embodiments, when control pane 161 is presented in the viewing screen 155, the "up arrow" button 151 and "down arrow" button 152 of the input device 113 are configured for navigating through the control tools 170-173. As a user navigates through the control tools 170-173, the currently selected control tool may be indicated as being selected in any suitable way, including magnification of an icon representative of the control tool, as described above. The "select" button 153 of the input device 113 may be configured for activating the selected control tool.

In certain embodiments, when control pane 161 and/or application pane 175 are/is presented in the viewing screen 155, the "left arrow" button 149 of the input device 113 may be configured to cause the control pane 161 or the application pane 175 to go off screen. Upon selection of the "left arrow" button 149 when the viewing screen 155 includes contents presented as shown in FIG. 9, for example, the display configuration presented in the viewing screen 155 may return from that shown in FIG. 9 to that shown in FIG. 8. Upon selection of the "left arrow" button 149 when the viewing screen 155 includes contents presented as shown in FIG. 8, for example, the display configuration presented in the viewing screen 155 may return from that shown in FIG. 8 to that shown in FIG. 5.

In certain embodiments, the viewing screen 155 may include one or more "fill-in" panes, as shown in FIGS. 8 and 9. In FIG. 8, the viewing screen 155 includes "fill-in" pane 174 in which information related to the media content instance being presented is provided for consideration by the user. As the configuration of the contents presented in the viewing screen 155 is adjusted as described above, in some configurations, the viewing screen 155 may have unused space, which can be used by the media content processing subsystem 110 to automatically provide additional information to the user. In FIG. 8, "fill-in" pane 174 is presented where space has become available generally below the media content display 156 as a result of the media content display 156 being resized and shifting to make room for control pane 161 in the viewing screen 155. In the embodiment of FIG. 8, "fill-in" pane 174 includes information descriptive of and/or related to the media content instance being displayed. However, any suitable information may be presented in "fill-in" pane 174.

The number, configuration, and/or contents of fill-in panes may be dynamically adjusted based on the current display configuration. For example, the display configuration of FIG. 8, which includes "fill-in" pane 174, may be adjusted to the display configuration shown in FIG. 9, which includes two separate "fill-in" panes 177 and 178. As shown, "fill-in" pane 177 may be smaller in size and include less information than "fill-in" pane 174. Information redacted from "fill-in" pane 174 may be included in another "fill-in" pane such as "fill-in" pane 178. In FIG. 9, the two "fill-in" panes 177 and 178 are configured to make use of space in the viewing screen 155 that has become available due to resizing and shifting of the media content display 156 in the viewing screen 155.

"Fill-in" panes (e.g., "fill-in" panes 174, 177, and 178) may be configured to maximize the use of display space in the viewing screen 155. As display configurations change to accommodate control panes together with a display of a media content instance, "fill-in" panes may populate what would be otherwise available space in the viewing screen 155 with information that may be potentially helpful or interesting to a user. In certain embodiments, "fill-in" panes may include advertisements (e.g., telescoping advertisements) for advertisers who are sponsoring the media content instance being displayed. Accordingly, the "fill-in" panes can be a source of revenue for a carrier and/or provider of media content. In similar manner, advertisements may also be included in control panes and used to generate revenue.

Figure 10:
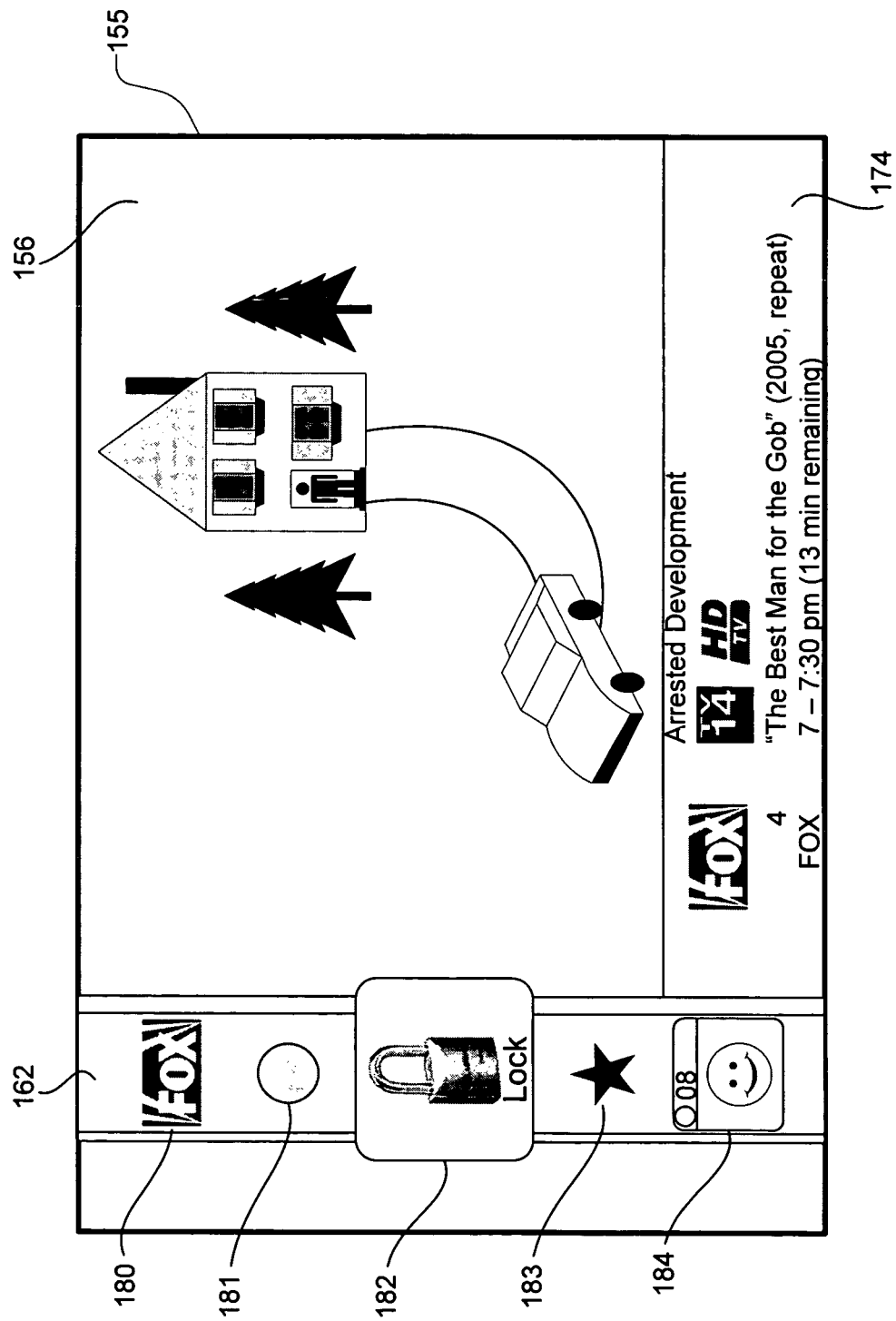
FIG. 10 illustrates the viewing screen of FIG. 5 with a third control pane displayed within the viewing screen and adjacent to third edge of a display of media content, according to an embodiment.

FIG. 10 illustrates the viewing screen 155 of FIG. 5 with a third control pane 162 displayed within the viewing screen 155 and adjacent to third edge of media content display 156, which has been resized and shifted to make room for the control pane 162 in the viewing screen 155. The control pane 162 may be inserted in the viewing screen 155 and presented as shown in FIG. 10 in response to a detection of any suitable predefined event, including a user providing a predefined input signal (e.g., actuation of the "left arrow" button 149 of the input device 113).

As shown in FIG. 10, control pane 162 may include a third set of control tools 180-184 that are navigable and selectable by a user. The set of control tools 180-184 included in control pane 162 may include any type of control tool, including any of the control tools described herein. In the embodiment of FIG. 10, control tools 180-184 include contextual tools that are specific to the active user profile and/or the media content instance being displayed. Contextual tools may include any control tools that provide information and/or functionality that is based on the active user profile and/or the media content instance being presented.

Examples of such control tools include, but are not limited to, a network programming tool 180, a media content recording tool 181, a lock tool 182, a ratings tool 183, and a related programming tool 184. Network programming tool 180, when activated, may cause an application pane to be presented for consideration by the user, the application pane including information descriptive of programming provided by the same broadcast network or channel that provides the media content instance being presented in viewing screen 155. In the embodiment of FIG. 10, for example, the media content instance is provided by the FOX network, and the network programming tool 180 is configured to provide the user with information (e.g., a network-specific program guide) descriptive of programming provided by, or other information associated with, the FOX network.

Media content recording tool 181, when activated, may be configured to cause the media content processing subsystem 110 to record the media content instance being presented. PVR application 142 may be executed and cause the media content instance to be recorded, as described above.

Lock tool 182, when activated, may be configured to cause parental control functions to be applied to the media content instance being presented. For example, the media content instance may be "locked" with respect to certain user profiles, meaning that those user profiles will be prevented from gaining access to the media content instance. This is a convenient way for a user to set parental control settings for the media content instance being presented.

Ratings tool 183, when activated, may be configured to cause the media content processing subsystem 110 to provide functionality for rating the media content instance being presented. Accordingly, a user experiencing the media content instance can conveniently use ratings tool 183 to assign a rating (e.g., four out of five stars) to the media content instance. In certain embodiments, the ratings tool 183 may be configured to enable the user to send an assigned rating to another user. In this manner, a user may recommend the media content instance to another user.

Related programming tool 184, when activated, may be configured to cause the media content processing subsystem 110 to provide functionality for accessing programming that is related to the media content instance being presented. For example, related programming tool 184 may provide functionality for identifying other instances of media content that share a common attribute (e.g., a common actor or genre) with the media content instance being presented.

In certain embodiments, when control pane 162 is presented in the viewing screen 155, the "up arrow" button 151 and "down arrow" button 152 of the input device 113 are configured for use in navigating through the control tools 180-184. As a user navigates through the control tools 180-184, the currently selected control tool may be indicated as being selected in any suitable way, including magnification of an icon representative of the control tool, as shown in FIG. 10. The "select" button 153 of the input device 113 may be configured for activating the selected control tool (or functionality associated with the control tool).

In certain embodiments, when control pane 162 is presented in the viewing screen 155, the "right arrow" button 150 of the input device 113 may be configured to cause the control pane 162 to go off screen. Upon selection of the "right arrow" button 150 when the viewing screen 155 includes contents presented as shown in FIG. 10, for example, the display configuration presented in the viewing screen 155 may return from that shown in FIG. 10 to that shown in FIG. 5.

Figure 11:
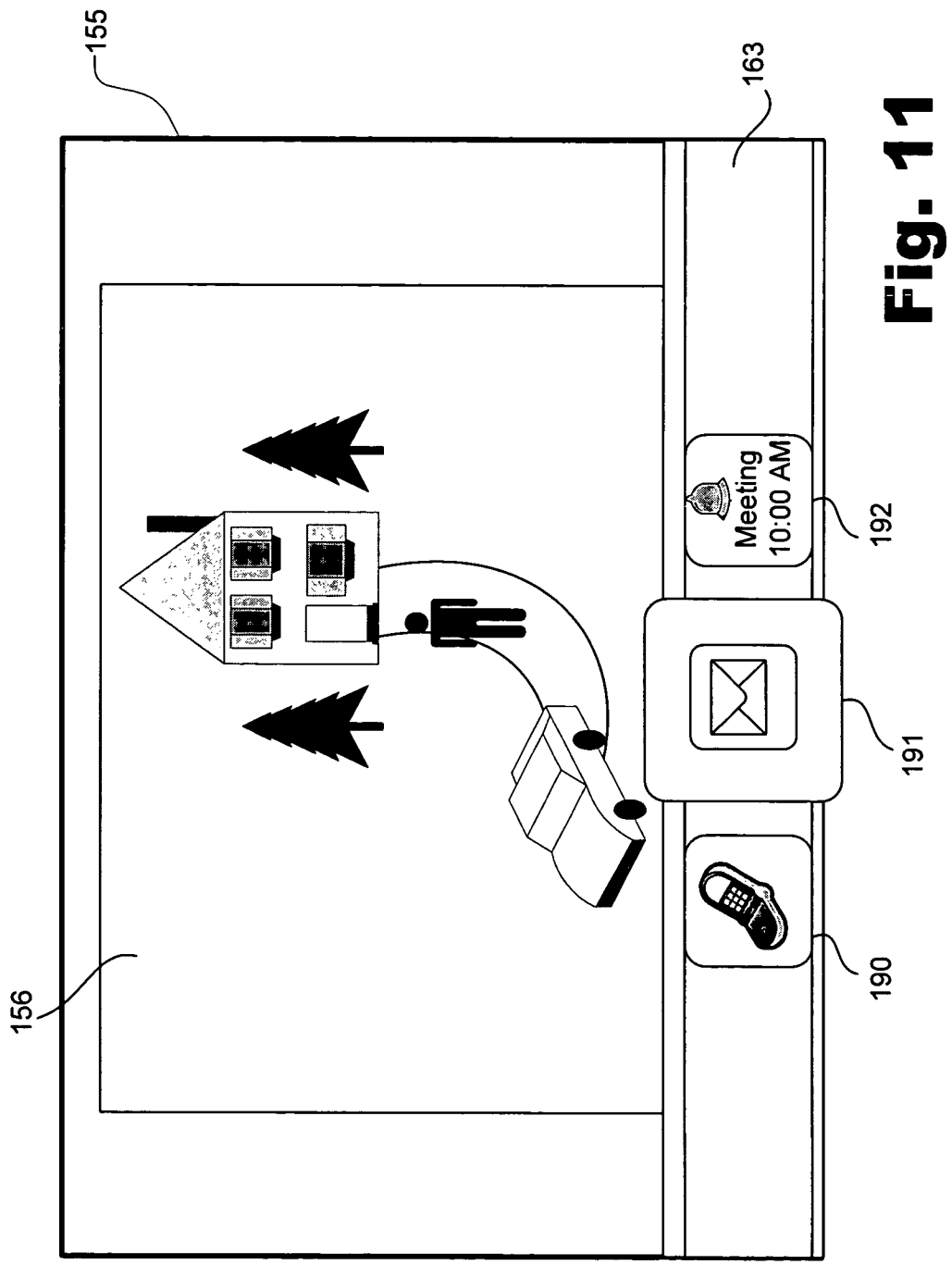
FIG. 11 illustrates the viewing screen of FIG. 5 with a fourth control pane displayed within the viewing screen and adjacent to fourth edge of a display of media content, according to an embodiment.

FIG. 11 illustrates the viewing screen 155 of FIG. 5 with a fourth control pane 163 displayed within the viewing screen 155 and adjacent to fourth edge of media content display 156, which has been resized and shifted to make room for the control pane 163 in the viewing screen 155. The control pane 163 may be inserted in the viewing screen 155 and presented as shown in FIG. 11 in response to a detection of any suitable predefined event, including a user providing a predefined input signal (e.g., actuation of the "down arrow" button 152 of the input device 113).

As shown in FIG. 11, control pane 163 may include a fourth set of control tools 190-192 that are navigable and selectable by a user. The set of control tools 190-192 included in control pane 163 may include any type of control tool, including any of the control tools described herein. In the embodiment of FIG. 11, control tools 190-192 include notification control tools, which may include any tools configured to provide the user with access to notifications, including notifications that the user has elected to receive and/or notifications from third parties or third-party applications.

Examples of notification control tools include, but are not limited to, a voicemail notification tool 190, an incoming e-mail notification tool 191, and a calendar notification tool 192. Voicemail notification tool 190 may be configured to provide a notification when a new voicemail message has been received by a voicemail service being used (e.g., subscribed to) by the user. E-mail notification tool 191 may be configured to provide a notification when a new e-mail message has been received by an electronic mail service being used by the user. Calendar notification tool 192 may be configured to provide a notification of an upcoming event (e.g., appointment) that has been scheduled in a scheduling service or application being used by the user. Each of the control tools 190-192 may also be configured as a shortcut to an application pane such that the user may use the control tools 190-192 to gain access to applications (e.g., an e-mail application) used by the user.

In certain embodiments, when control pane 163 is presented in the viewing screen 155, the "left arrow" button 149 and "right arrow" button 150 of the input device 113 are configured for use in navigating through the control tools 190-192. As a user navigates through the control tools 190-192, the currently selected control tool may be indicated as being selected in any suitable way, including magnification of an icon representative of the control tool, as shown in FIG. 11. The "select" button 153 of the input device 113 may be configured for activating the selected control tool (or functionality associated with the control tool).

In certain embodiments, when control pane 163 is presented in the viewing screen 155, the "up arrow" button 151 of the input device 113 may be configured to cause the control pane 163 to go off screen. Upon selection of the "up arrow" button 151 when the viewing screen 155 includes contents presented as shown in FIG. 11, for example, the display configuration presented in the viewing screen 155 may return from that shown in FIG. 11 to that shown in FIG. 5.

Control panes and control tools included in the control panes may be configurable by a user of the processing subsystem 110. In particular, the control pane application 143 may include functionality that enables the user to choose different settings for the control panes. For example, the user may select a position at which a control will be displayed and the control tools to be included in the control pane. The user may also be provided with functionality for assigning input commands (e.g., which buttons of the user input device 113) to control panes. These features enable different users to customize menus of control tools, the display of the control panes including the menus, and the associations between input commands and control panes such that the control panes fit the preferences of each particular user. The user can configure the control panes and tools in a manner that will minimize the interference that the control panes may have on the viewing habits and preferences of the user.

The control tools described above are exemplary and not limiting. Other examples may include different control tools or combinations of control tools. Examples of other control tool information and/or functionality that may be included in the control panes include, but are not limited to, dynamically loaded video, audio, and multimedia, voice and video communications functionality and interfaces, collaborative viewing interfaces, a drop box for flagging media content or a snippet of media content, Rich Site Summary (RSS) newsfeeds, a link to a third-party video portal, and a video display enabling a user to jump to media content being recorded by another tuner 137.

III. Exemplary Process View

Figure 12:
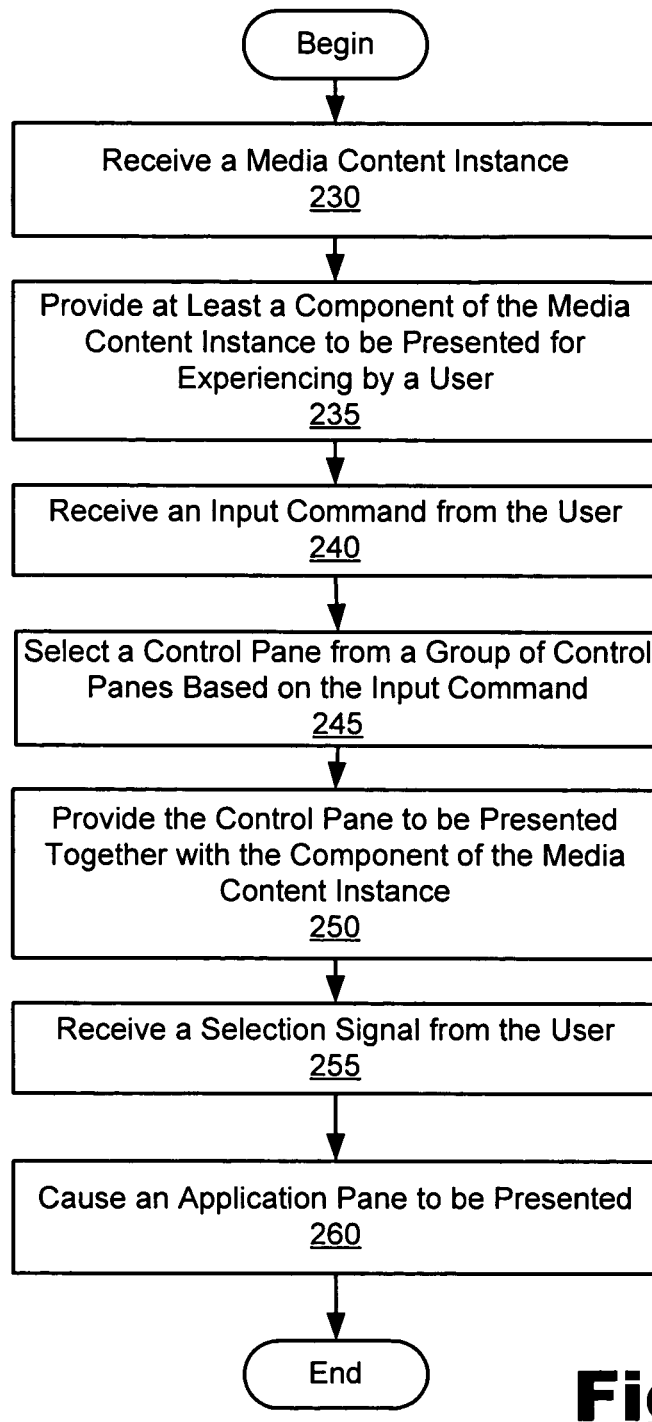
FIG. 12 is a flowchart illustrating an exemplary method of providing control tools together with a presentation of with media content, according to an embodiment.

FIG. 12 illustrates an exemplary method of providing control tools together with a presentation of with media content, according to an embodiment. While FIG. 12 illustrates exemplary steps according to one embodiment, other embodiments may omit, add to, reorder, and/or modify any of the steps shown in FIG. 12.

In step 230, a media content instance is received. Step 230 may be performed in any of the ways described above, including the processing subsystem 110 receiving a data stream containing the media content instance from the media content provider 111.

In step 235, at least a component of the media content instance is provided to be presented for experiencing by a user. Step 235 may be performed in any of the ways described above, including the processing subsystem 110 providing a first output signal containing data representative of the media content instance to the user device 112, which can present the media content instance for experiencing by the user. For example, at least a component of the media content instance may be displayed for viewing by the user.

In step 240, an input command is received from the user. Step 240 may be performed in any of the ways described above, including the processing subsystem 110 receiving the input command from the input device 113 when the user actuates a predetermined button on the input device 113 while the media content instance is being displayed. Of course, any suitable input mechanism and signal may be employed.

In step 245, a control pane is selected from a group of control panes based on the input command. Step 245 may be performed in any of the ways described above, including any of control panes 160-163 being selected based on the input command. For example, control pane 160 may be selected when the input command is indicative of an input mechanism pre-associated with the control pane 160 (e.g., a pre-configured button on input device 113) being actuated by a user.

In step 250, in response to the input command, the selected control pane is provided to be presented, together with the component of the media content instance, for consideration by the user. Step 250 may be performed in any of the ways described above presenting the control pane in a manner that generally does not obstruct the presentation of the media content instance. As described above, a display of the media content instance (or component thereof) may be resized and shifted to make space for the media content instance and the control pane in a single viewing screen. The processing subsystem 110 may send a second output signal including the media content instance and the control pane to the user device 112 for concurrent presentation of the media content instance (or component thereof) and the control pane. As described above, the control pane may include a set of one or more control tools. The control tools may be organized into a menu or listing of multiple control tools.

In step 255, a selection signal is received from a user. Step 255 may be performed in any of the ways described above, including the processing subsystem 110 receiving the selection signal from the input device 113 when the user actuates a predetermined button on the input device 113 while the control pane is being displayed. Of course, any suitable input mechanism and signal may be employed. The selection signal typically indicates a user activation of a control tool included in the control pane.

In step 260, an application pane is caused to be presented (e.g., displayed) for consideration by the user. Step 260 may be performed in response to the selection signal, and the application pane presented corresponds with (i.e., is pre-associated with) the selected control tool.

Steps 240-260 may be performed while the media content instance (or at least a component of the media content instance) continues to be presented for experiencing by the user, the presentation of the media content being generally unobstructed by the control pane or the application pane. Accordingly, the user is provided with a wide range of control tools that are conveniently accessible and usable while a media content instance is being presented.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A system comprising:
a media content processing subsystem, said media content subsystem including an output driver configured to provide at least a component of a media content instance to a display for presentation to a user, and a receiver configured to receive at least one input command initiated by the user during said presentation of said at least a component of said media content instance; wherein a media content instance is at least one of a television program, on-demand program, pay-per-view program, broadcast media program, video-on demand program, commercial, video, movie, song, or audio program;
a set of user profiles; and
a group of control panes, wherein each control pane in the group of control panes includes a display of a set of icons, each icon representing one control tool for performing an electronic function, wherein each of said control panes includes a different set of control tool icons, and wherein the group of control panes at least partially surrounds said media content instance outside of a viewable portion of the display, wherein said media content processing subsystem is configured to select a control pane from the group of control panes based on a first input command of said at least one input command and shifts said media content instance into a viewing area defined by at least one of the viewable portion of said display and said selected control pane such that said selected control pane is viewable on the display concurrently with said media content instance in response to said first input command;

wherein said media content processing subsystem is further configured to select a user profile of said set of user profiles based on a second command of said at least one input command, wherein said set of user profiles are displayed as icons in a control pane of said group of control panes, and wherein at least some of said control tools are contextually selected for inclusion in said group of control panes based on said selected user profile, and wherein said media content processing subsystem is further configured to adjust a size and location of the viewing area based on said control pane selected.

2. The system of claim 1, said control pane generally unobstructing said at least a component of said media content instance in said concurrent display.

3. The system of claim 1, wherein one control tool is a sharing tool for sharing at least a portion of said media content instance with another user.

4. The system of claim 1, wherein said control tools include at least one of a ratings tool for rating said media content instance, and a recommendation tool for recommending said media content instance to another user.

5. The system of claim 1, wherein said control tools include at least one shortcut tool configured to provide access to at least one of additional information and additional functionality.

6. The system of claim 5, wherein said at least one of said additional information and said additional functionality includes at least one of traffic information, task management information, instant messaging functionality, and voicemail functionality.

7. The system of claim 5, wherein said media content processing subsystem is configured to receive a selection signal initiated by the user during said concurrent presentation of said at least a component of said media content instance and said control pane, and provide, in response to said selection signal, an application pane to the display for concurrent presentation of said at least a component of said media content instance, said control pane, and said application pane to the user, said application pane including said at least one of said additional information and said additional functionality.

8. The system of claim 1, wherein said control pane includes a navigable set of said control tools.

9. The system of claim 1, wherein each said control pane in said group of control panes includes a different type of said control tools.

10. The system of claim 1, wherein said group of control panes includes a first control pane configured to be selectively presented adjacent a first edge of said at least a component of said media content instance in said concurrent presentation, and a second control pane configured to be selectively presented adjacent a second edge of said at least a component of said media content instance in said concurrent display.

11. The system of claim 1, wherein said media content subsystem is configured to resize said media content instance to make space for said selected control pane while concurrently displayed with said media content instance.

12. The system of claim 1, wherein said at least a component of said media content instance and said group of control panes are disposed on a common graphical interface layer.

13. The system of claim 12, wherein said media content processing subsystem is configured to transition from displaying said media content instance independent of said control pane to concurrently displaying said at least a component of said media content instance and said control pane by zooming out and shifting said common graphical user interface layer relative to a viewing screen of the display.

14. The system of claim 1, wherein the media content instance is resized such that the media content instance is viewable with said selected control pane on the display, and wherein the display defines unused space adjacent to said media content instance after said media content instance is resized, and further comprising fill-in panes disposed in the unused space adjacent said media content instance.

15. The system of claim 14, wherein the fill-in panes include additional information about at least one of said selected control pane and said media content instance.

16. An apparatus comprising:
a communication interface configured to receive a data stream from a media content provider communicatively coupled to said apparatus by a network, said data stream including a media content instance; wherein a media content instance is at least one of a television program, on-demand program, pay-per-view program, broadcast media program, video-on demand program, commercial, advertisement, video, movie, song, or audio program;
at least one processor configured to provide a first output signal configured to cause a user device communicatively coupled to said apparatus to present at least a component of said media content instance for experiencing by a user;
a set of user profiles accessible by the processor; and
a receiver configured to receive at least one input command from an input device communicatively coupled to said apparatus, said at least one input command being initiated by the user during said presentation of said at least a component of said media content instance;
wherein said at least one processor is configured to select a control pane from a group of control panes wherein each control pane in the group of control panes includes a display of a set of icons, each icon representing one control tool for performing an electronic function, wherein each of said control panes includes a different set of control tool icons, and wherein the group of control panes at least partially surrounds said media content instance outside of a viewable portion of the user device,
wherein said at least one processor selects said control pane based on a first input command of said at least one input command and shifts said media content instance into a viewing area defined by at least one of the viewable area of said display and said selected control pane such that said selected control pane is viewable on the user device concurrently with said media content instance for consideration by the user,
wherein said at least one processor is further configured to select a user profile of said set of user profiles based on a second command of said at least one input command, wherein said set of user profiles are displayed as icons in a control pane of said group of control panes, and wherein at least some of said control tools are contextually selected for inclusion in said group of control panes based on said selected user profile,
wherein said processor is further configured to adjust a size and location of the viewing area based on said control pane selected.

17. The apparatus of claim 16, wherein said control tools include at least one of a ratings tool for rating said media content instance, a recommendation tool for recommending said media content instance to another user, and a sharing tool for sharing at least a portion of said media content instance with another user.

18. The apparatus of claim 16, wherein said control tools include at least one shortcut tool configured to provide access to at least one of additional information and additional functionality.

19. The apparatus of claim 18, wherein said at least one of additional information and additional functionality is provided by a third-party device communicatively coupled to at least one of said apparatus and said media content provider.

20. A method comprising:
providing at least a component of a media content instance to a display for presentation to a user, wherein a media content instance is at least one of a television program, on-demand program, pay-per-view program, broadcast media program, video-on demand program, commercial, video, movie, song, or audio program;
receiving at least one input command initiated by the user during said presentation of said at least a component of said media content instance;
selecting a control pane from a group of control panes wherein each control pane in the group of control panes includes a display of a set of icons, each icon representing one control tool for performing an electronic function, wherein each of said control panes includes a different set of control tool icons, and wherein the group of control panes at least partially surrounds said media content instance outside of a viewable portion of the display, wherein the control pane is selected based on a first command of said at least one input command;
providing to a display for presentation to a user a set of user profiles represented by icons in a control pane of said group of control panes;
selecting a user profile from said set of user profiles based on a second command of said at least one input command;
selecting at least some of said control tools for inclusion in said group of control panes based on said selected user profile;
shifting said media content instance to a viewing area defined by at least one of the viewable portion of the display and the selected control pane such that said control pane is viewable on the display concurrently with said media content instance; and
adjusting a size and location of the viewing area based on the control pane selected.

21. The method of claim 20, said control pane generally unobstructing said at least a component of said media content instance in said concurrent display.

22. The method of claim 20, further comprising disposing said at least a component of said media content instance and said plurality of control panes on a common graphical interface layer.

23. The method of claim 22, further comprising resizing said common graphical interface layer relative to a viewing screen of the display to make space for said control pane while concurrently displayed with said media content instance.

24. The method of claim 22, wherein each of said control panes is positioned adjacent a different edge of said at least a component of said media content instance.

25. The method of claim 20, further comprising associating a control tool type with each of said control panes, each of said control panes including a different type of said control tools.

* * * * *